(12) United States Patent
Takeda et al.

(10) Patent No.: US 11,838,916 B2
(45) Date of Patent: Dec. 5, 2023

(54) DOWNLINK CONTROL INFORMATION DESIGN FOR MULTI-COMPONENT CARRIER SCHEDULING

(71) Applicant: QUALCOMM Incorporated, San Diego, CA (US)

(72) Inventors: Kazuki Takeda, Tokyo (JP); Wanshi Chen, San Diego, CA (US); Peter Gaal, San Diego, CA (US); Xiaoxia Zhang, San Diego, CA (US); Huilin Xu, Temecula, CA (US); Mostafa Khoshnevisan, San Diego, CA (US); Tao Luo, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 17/225,912

(22) Filed: Apr. 8, 2021

(65) Prior Publication Data

US 2021/0321443 A1 Oct. 14, 2021

Related U.S. Application Data

(60) Provisional application No. 63/008,437, filed on Apr. 10, 2020.

(51) Int. Cl.
*H04W 76/10* (2018.01)
*H04L 5/00* (2006.01)
(Continued)

(52) U.S. Cl.
CPC .......... *H04W 72/23* (2023.01); *H04L 1/0013* (2013.01); *H04L 5/0048* (2013.01); *H04W 72/0453* (2013.01); *H04W 76/10* (2018.02)

(58) Field of Classification Search
None
See application file for complete search history.

(56) References Cited

U.S. PATENT DOCUMENTS

2016/0227425 A1* 8/2016 Kim ..................... H04L 5/0073
2017/0250781 A1* 8/2017 Golitschek Edler Von
Elbwart ................ H04L 1/0026
(Continued)

OTHER PUBLICATIONS

International Search Report and Written Opinion—PCT/US2021/026669—ISA/EPO—dated Jun. 17, 2021.

*Primary Examiner* — Andrew C Oh

(57) ABSTRACT

Methods, systems, and devices for wireless communications are described. A base station may transmit downlink control information (DCI) to a user equipment (UE) indicating a joint field for at least a first component carrier (CC) and a second CC of a carrier aggregation configuration. For example, the joint field may include a rate matching (RM) indication for the first CC and the second CC, a zero power channel state information reference signal (ZP-CSI-RS) indication for the first CC and the second CC, or both. In some cases, the RM indication may include a common RM resource (RMR) configuration applicable for both the first CC and the second CC or per-CC RMR configurations that indicate separate RMRs for each of the CCs. Additionally, the ZP-CSI-RS indication may include a set identifier that indicates a resource set for ZP-CSI-RS resources for both the first CC and the second CC.

21 Claims, 20 Drawing Sheets

(51) Int. Cl.
*H04L 1/00* (2006.01)
*H04W 72/0453* (2023.01)
*H04W 72/23* (2023.01)

(56) References Cited

U.S. PATENT DOCUMENTS

| | | | |
|---|---|---|---|
| 2018/0035409 A1* | 2/2018 | Chmiel | H04L 1/1835 |
| 2018/0213477 A1* | 7/2018 | John Wilson | H04W 28/22 |
| 2019/0029006 A1* | 1/2019 | Wang | H04W 4/40 |
| 2019/0200355 A1* | 6/2019 | Baldemair | H04L 5/0053 |
| 2019/0215096 A1* | 7/2019 | Kim | H04L 5/0051 |
| 2019/0363824 A1* | 11/2019 | Sun | H04L 5/0091 |
| 2020/0008235 A1* | 1/2020 | Sarkis | H04L 5/0055 |
| 2020/0015176 A1* | 1/2020 | Li | H04L 1/1861 |
| 2020/0022168 A1* | 1/2020 | Xu | H04L 5/0053 |
| 2020/0059927 A1* | 2/2020 | Sun | H04W 56/0015 |
| 2020/0059943 A1* | 2/2020 | Ren | H04W 72/54 |
| 2020/0178287 A1* | 6/2020 | Kim | H04W 72/23 |
| 2020/0196346 A1* | 6/2020 | Khoshnevisan | H04L 1/08 |
| 2021/0307054 A1* | 9/2021 | Hosseini | H04L 5/0048 |
| 2021/0345306 A1* | 11/2021 | Takeda | H04B 7/0408 |
| 2022/0103270 A1* | 3/2022 | Miao | H04B 17/345 |
| 2022/0159706 A1* | 5/2022 | Panteleev | H04L 1/08 |

\* cited by examiner

DOWNLINK CONTROL INFORMATION DESIGN FOR MULTI-COMPONENT CARRIER SCHEDULING

CROSS REFERENCE

The present application for patent claims the benefit of U.S. Provisional Patent Application No. 63/008,437 by TAKEDA et al., entitled "DOWNLINK CONTROL INFORMATION DESIGN FOR MULTI-COMPONENT CARRIER SCHEDULING," filed Apr. 10, 2020, assigned to the assignee hereof, and expressly incorporated by reference herein.

TECHNICAL FIELD

The following relates generally to wireless communications and more specifically to downlink control information (DCI) design for multi-component carrier (CC) scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may support carrier aggregation (CA), where the UE communicates with multiple cells simultaneously. For example, the UE may communicate with a first base station (e.g., a primary cell (PCell) or a first component carrier (CC)) and with a second base station (e.g., a secondary cell (SCell) or a second CC) at the same time. Additionally or alternatively, a single base station may include multiple cells (e.g., both a PCell and an SCell or multiple CCs), where the UE communicates with two or more cells on the single base station at the same time. Efficient techniques are desired for enabling carrier aggregation communications.

SUMMARY

The described techniques relate to improved methods, systems, devices, and apparatuses that support downlink control information (DCI) design for multi-component carrier (CC) scheduling. Generally, the described techniques provide for a base station to transmit a DCI to a user equipment (UE) indicating a joint field for at least a first CC and a second CC of a carrier aggregation configuration. For example, the joint field may include a rate matching (RM) indication for the first CC and the second CC, a zero power channel state information reference signal (ZP-CSI-RS) indication for the first CC and the second CC, or a combination thereof. Subsequently, the UE and the base station may then communicate based on the DCI and joint field. In some cases, the RM indication may include a common RM resource (RMR) configuration that is applicable for both the first CC and the second CC, per-CC RMR configurations that indicate separate (e.g., or same) RMRs for each of the CCs, or a combination thereof. Additionally, the ZP-CSI-RS indication may include a set identifier that indicates a resource set for ZP-CSI-RS resources that is used for both the first CC and the second CC.

A method of wireless communications at a UE is described. The method may include connecting to a base station over a first CC and a second CC according to a carrier aggregation configuration; receiving, from the base station, DCI including a joint field including one or more of an RM indication for the first CC and the second CC or a zero power reference signal indication for the first CC and the second CC; and communicating with the base station according to the carrier aggregation configuration based on the DCI including the joint field.

An apparatus for wireless communications at a UE is described. The apparatus may include at least one processor, memory coupled (e.g., operatively, communicatively, functionally, electronically, or electrically) to the at least one processor, and instructions stored in the memory. The instructions may be executable by the processor to cause the apparatus to connect to a base station over a first CC and a second CC according to a carrier aggregation configuration; to receive, from the base station, DCI including a joint field including one or more of an RM indication for the first CC and the second CC or a zero power reference signal indication for the first CC and the second CC; and to communicate with the base station according to the carrier aggregation configuration based on the DCI including the joint field.

Another apparatus for wireless communications at a UE is described. The apparatus may include means for connecting to a base station over a first CC and a second CC according to a carrier aggregation configuration; means for receiving, from the base station, DCI including a joint field including one or more of an RM indication for the first CC and the second CC or a zero power reference signal indication for the first CC and the second CC; and means for communicating with the base station according to the carrier aggregation configuration based on the DCI including the joint field.

A non-transitory computer-readable medium storing code for wireless communications at a UE is described. The code may include instructions executable by at least one processor to connect to a base station over a first CC and a second CC according to a carrier aggregation configuration; to receive, from the base station, DCI including a joint field including one or more of an RM indication for the first CC and the second CC or a zero power reference signal indication for the first CC and the second CC; and to communicate with the base station according to the carrier aggregation configuration based on the DCI including the joint field.

Some examples of the method, apparatuses, and non-transitory computer-readable medium described herein may further include operations, features, means, or instructions for determining a common RMR from a set of common RMR configurations for the first CC and the second CC based on the joint field for the RM indication.

Some examples of the method, apparatuses, and non-transitory computer-readable medium described herein may further include operations, features, means, or instructions for receiving, from the base station, an indication of the set of common RMR configurations via radio resource control (RRC) signaling.

Some examples of the method, apparatuses, and non-transitory computer-readable medium described herein may further include operations, features, means, or instructions for receiving, from the base station, a trigger field for a dynamic RM of the common RMR for the first CC and the second CC via DCI.

In some examples of the method, apparatuses, and non-transitory computer-readable medium described herein, each bit of the joint field for the RM indication may include an indication of an RMR group configured for the common RMR configurations.

Some examples of the method, apparatuses, and non-transitory computer-readable medium described herein may further include operations, features, means, or instructions for determining a first RMR for the first CC and a second RMR for the second CC based on the joint field for the RM indication.

Some examples of the method, apparatuses, and non-transitory computer-readable medium described herein may further include operations, features, means, or instructions for receiving, from the base station, an indication of per-CC RMR configurations for each CC of the carrier aggregation configuration, where the first RMR and the second RMR may be determined based on the per-CC RMR configurations.

Some examples of the method, apparatuses, and non-transitory computer-readable medium described herein may further include operations, features, means, or instructions for receiving, from the base station, a trigger field for a dynamic RM of the first RMR, the second RMR, or both via DCI.

In some examples of the method, apparatuses, and non-transitory computer-readable medium described herein, each bit of the joint field for the RM indication may include an indication of an RMR group configured for each CC of the carrier aggregation configuration.

Some examples of the method, apparatuses, and non-transitory computer-readable medium described herein may further include operations, features, means, or instructions for determining that a CC of the carrier aggregation configuration may be not configured with a corresponding RMR group, and refraining from performing a RM procedure for the CC based on the determination that the corresponding RMR group may be not configured for the CC.

Some examples of the method, apparatuses, and non-transitory computer-readable medium described herein may further include operations, features, means, or instructions for receiving, from the base station, an additional field for an additional RM indication for the second CC, where communications with the base station may be based on the additional RM indication.

Some examples of the method, apparatuses, and non-transitory computer-readable medium described herein may further include operations, features, means, or instructions for determining, from the base station, a zero power reference signal configuration for the first CC and the second CC based on the joint field for the zero power reference signal indication.

Some examples of the method, apparatuses, and non-transitory computer-readable medium described herein may further include operations, features, means, or instructions for receiving, from the base station, a second additional field for an additional zero power reference signal indication for the second CC.

Some examples of the method, apparatuses, and non-transitory computer-readable medium described herein may further include operations, features, means, or instructions for receiving, from the base station, a trigger field for a set identifier associated with the zero power reference signal indication, and determining a resource set for the zero power reference signal indication based on the set identifier, where the resource set may be used for the first CC and the second CC.

Some examples of the method, apparatuses, and non-transitory computer-readable medium described herein may further include operations, features, means, or instructions for determining that a CC of the carrier aggregation configuration may be not configured with a zero power reference signal resource set corresponding to the determined resource set, where the trigger field may be ignored for the CC based on the determination that the zero power reference signal resource set may be not configured for the CC.

In some examples of the method, apparatuses, and non-transitory computer-readable medium described herein, the trigger field may be received via DCI.

In some examples of the method, apparatuses, and non-transitory computer-readable medium described herein, the zero power reference signal indication may include a ZP-CSI-RS resource set indication.

In some examples of the method, apparatuses, and non-transitory computer-readable medium described herein, the RM indication may include a RM pattern group indication.

A method of wireless communications at a base station is described. The method may include connecting to a UE over a first CC and a second CC according to a carrier aggregation configuration; transmitting, to the UE, DCI including a joint field including one or more of an RM indication for the first CC and the second CC or a zero power reference signal indication for the first CC and the second CC; and communicating with the UE according to the carrier aggregation configuration based on the DCI including the joint field.

An apparatus for wireless communications at a base station is described. The apparatus may include at least one processor, memory coupled (e.g., operatively, communicatively, functionally, electronically, or electrically) to the at least one processor, and instructions stored in the memory. The instructions may be executable by the processor to cause the apparatus to connect to a UE over a first CC and a second CC according to a carrier aggregation configuration; to transmit, to the UE, DCI including a joint field including one or more of an RM indication for the first CC and the second CC or a zero power reference signal indication for the first CC and the second CC; and to communicate with the UE according to the carrier aggregation configuration based on the DCI including the joint field.

Another apparatus for wireless communications at a base station is described. The apparatus may include means for connecting to a UE over a first CC and a second CC according to a carrier aggregation configuration; means for transmitting, to the UE, DCI including a joint field including one or more of an RM indication for the first CC and the second CC or a zero power reference signal indication for the first CC and the second CC; and means for communicating with the UE according to the carrier aggregation configuration based on the DCI including the joint field.

A non-transitory computer-readable medium storing code for wireless communications at a base station is described. The code may include instructions executable by at least one processor to connect to a UE over a first CC and a second CC according to a carrier aggregation configuration; to transmit, to the UE, DCI including a joint field including one or more of an RM indication for the first CC and the second CC or a zero power reference signal indication for the first CC and the second CC; and to communicate with the UE according to the carrier aggregation configuration based on the DCI including the joint field.

Some examples of the method, apparatuses, and non-transitory computer-readable medium described herein may further include operations, features, means, or instructions for transmitting, in the joint field for the RM indication, an indication of a common RMR from a set of common RMR configurations for the first CC and the second CC.

Some examples of the method, apparatuses, and non-transitory computer-readable medium described herein may further include operations, features, means, or instructions for transmitting, to the UE, an indication of the set of common RMR configurations via RRC signaling.

Some examples of the method, apparatuses, and non-transitory computer-readable medium described herein may further include operations, features, means, or instructions for transmitting, to the UE, a trigger field for a dynamic RM of the common RMR for the first CC and the second CC via DCI.

In some examples of the method, apparatuses, and non-transitory computer-readable medium described herein, each bit of the joint field for the RM indication may include an indication of an RMR group configured for the common RMR configurations.

Some examples of the method, apparatuses, and non-transitory computer-readable medium described herein may further include operations, features, means, or instructions for transmitting, in the joint field for the RM indication, a first RMR for the first CC and a second RMR for the second CC.

Some examples of the method, apparatuses, and non-transitory computer-readable medium described herein may further include operations, features, means, or instructions for transmitting, to the UE, an indication of per-CC RMR configurations for each CC of the carrier aggregation configuration, where the first RMR and the second RMR may be determined based on the per-CC RMR configurations.

Some examples of the method, apparatuses, and non-transitory computer-readable medium described herein may further include operations, features, means, or instructions for transmitting, to the UE, a trigger field for a dynamic RM of the first RMR, the second RMR, or both via DCI.

In some examples of the method, apparatuses, and non-transitory computer-readable medium described herein, each bit of the joint field for the RM indication may include an indication of an RMR group configured for each CC of the carrier aggregation configuration.

Some examples of the method, apparatuses, and non-transitory computer-readable medium described herein may further include operations, features, means, or instructions for transmitting, to the UE, an additional field for an additional RM indication for the second CC, where communications with the UE may be based on the additional RM indication.

Some examples of the method, apparatuses, and non-transitory computer-readable medium described herein may further include operations, features, means, or instructions for transmitting, to the UE, a zero power reference signal configuration for the first CC and the second CC based on the zero power reference signal indication in the joint field of the DCI.

Some examples of the method, apparatuses, and non-transitory computer-readable medium described herein may further include operations, features, means, or instructions for transmitting, to the UE, a second additional field for an additional zero power reference signal indication for the second CC.

Some examples of the method, apparatuses, and non-transitory computer-readable medium described herein may further include operations, features, means, or instructions for determining a resource set for the zero power reference signal indication, where the resource set may be used for the first CC and the second CC, and transmitting, to the UE, a trigger field for a set identifier associated with the zero power reference signal indication, the set identifier corresponding to the determined resource set.

In some examples of the method, apparatuses, and non-transitory computer-readable medium described herein, the trigger field may be transmitted via DCI.

In some examples of the method, apparatuses, and non-transitory computer-readable medium described herein, the zero power reference signal indication may include a ZP-CSI-RS resource set indication.

In some examples of the method, apparatuses, and non-transitory computer-readable medium described herein, the RM indication may include a RM pattern group indication.

DETAILED DESCRIPTION

Some wireless communications system may support communication between a user equipment (UE) and a base station on multiple aggregated component carriers (CCs), a feature referred to as carrier aggregation. For example, the base station may transmit a same downlink message to the UE across multiple CCs of a carrier aggregation configuration, such that the UE is able to combine the downlink message received on the multiple CCs to enhance reliability that the downlink message is successfully received and decoded. In some cases, the base station may transmit separate messages to configure communications on each CC of the carrier aggregation configuration. For example, the base station may transmit a first downlink control information (DCI) to configure transmission parameters for a first CC or a second DCI to configure transmission parameters for a second CC. However, sending multiple DCIs may increase signaling overhead based on using a high amount of resources to indicate the different transmission parameters for each CC.

As described herein, the base station may transmit a DCI to indicate joint-CC scheduling transmission parameters for downlink communications across multiple CCs at once. For example, the base station may transmit a joint field to the UE in the DCI that includes a rate matching (RM) indication for a first CC and a second CC, a zero power channel state information reference signal (ZP-CSI-RS) indication for the first CC and the second CC, or a combination thereof. Subsequently, the UE and the base station may then communicate based on the DCI and joint field. In some cases, the RM indication may include a common RM resource (RMR) configuration that is applicable for both the first CC and the second CC, per-CC RMR configurations that indicate separate (e.g., or same) RMRs for each of the CCs, or a combination thereof. Additionally, the ZP-CSI-RS indication may include a set identifier that indicates a resource set for ZP-CSI-RS resources that is used for both the first CC and the second CC.

Aspects of the disclosure are initially described in the context of wireless communications systems. Additionally, aspects of the disclosure are illustrated through an additional wireless communications system, RM indicators, multi-carrier configurations, a DCI design, and a process flow. Aspects of the disclosure are further illustrated by and described with reference to apparatus diagrams, system diagrams, and flowcharts that relate to DCI design for multi-CC scheduling.

Figure 1:
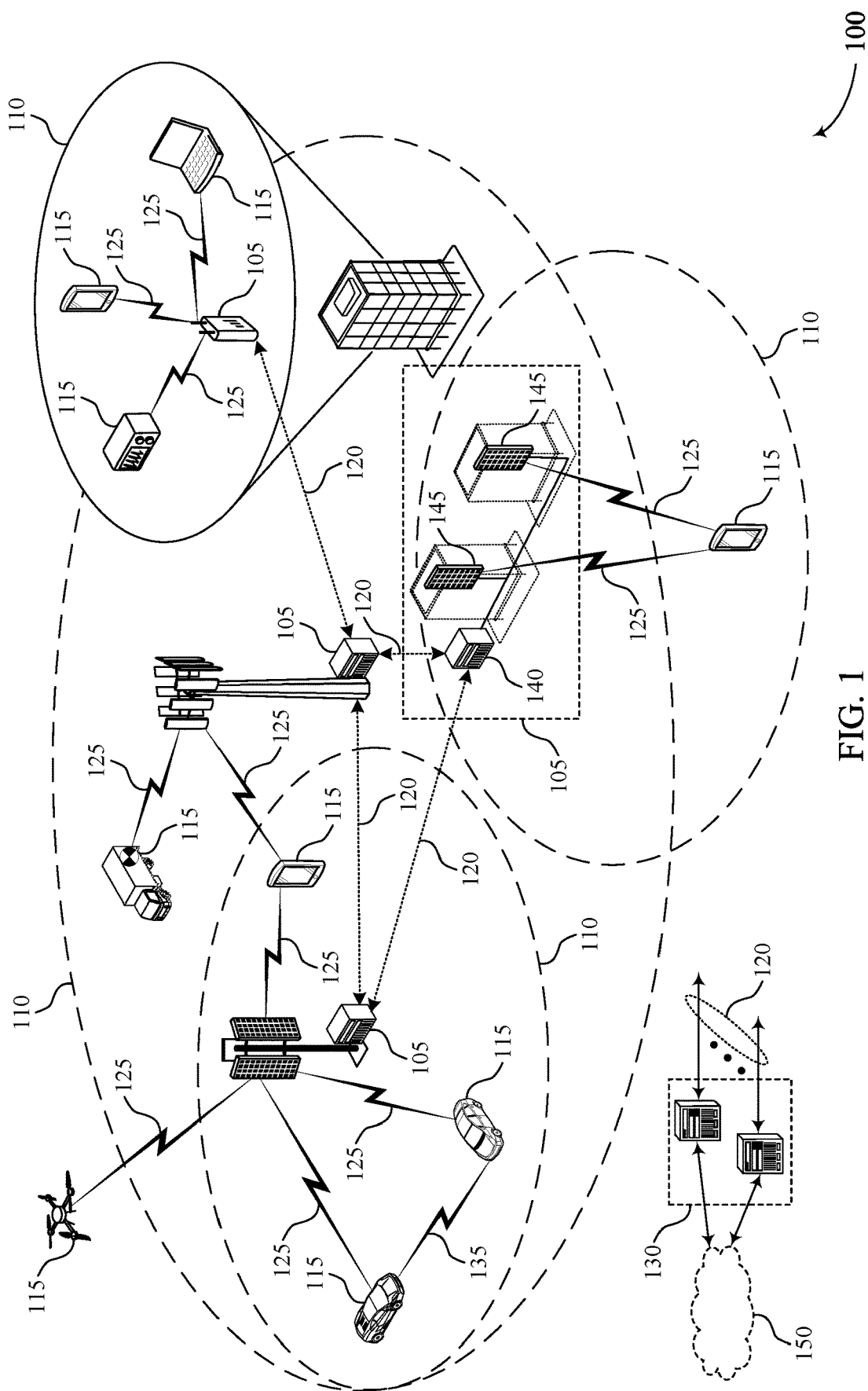
FIG. 1 illustrates an example of a system for wireless communications that supports downlink control information (DCI) design for multi-component carrier (CC) scheduling in accordance with aspects of the present disclosure.

FIG. 1 illustrates an example of a wireless communications system 100 that supports DCI design for multi-CC scheduling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), mMTC (massive MTC), and NB-IoT may include eNB-IoT (enhanced NB-IoT), or FeNB-IoT (further enhanced NB-IoT).

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs. Components within a wireless communication system may be coupled (for example, operatively, communicatively, functionally, electronically, and/or electrically) to each other.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a transmitting device (e.g., a UE 115, or a base station 105) may perform channel coding techniques so that a receiving device is likely to receive the correct message transmitted by the transmitting device. RM may be an example of a channel coding technique where RM procedures may include repeating or puncturing bits of a channel according to a configured rate. The rate may indicate the number of repetitions, where the lower the rate, the more repetitions that may be performed. For example, a rate of 1/4 may result in 4 repetitions of a bit and a rate of 1/3 may result in 3 repetitions of a bit. A transmitting device may be configured to perform RM according to a rate. In some cases, the number of repetitions associated with rates less than 1/3 may not provide additional coding gain and may result in an inefficient utilization of allocated resources.

In some systems, a transmitting device (e.g., a base station 105) may use RM to determine and configure a set of bits to be transmitted to a receiving device (e.g., a UE 115). For example, base station 105 a may perform RM on one or more redundancy versions (RVs) (e.g., to indicate where the bits for the codeword start within an encoded information message) that include control information, data, or a combination thereof to generate a transmission. A base station 105 may perform a RM procedure such as repetition or puncturing according to a coding rate. The coding rate may indicate a proportion of data that is useful by indicating the ratio of information bits to coded bits. For example, a coding rate of 1/2 may indicate that two coded bits may be transmitted for each information bit, where 2 minus 1 bits are redundant. As such, the lower the coding rate, the more redundant bits a base station 105 may generate. In some cases, the lower the coding rate, the more resource elements a base station 105 may need to transmit the higher number of bits.

A base station 105 may transmit a RM indicator in a DCI transmitted to the UE 115 to indicate how the UE 115 should perform a RM procedure when receiving a downlink message from the base station. In some cases, a UE 115 may be configured with up to two RM pattern groups (e.g., rateMatchPatternGroups), where each RM pattern group includes resource block (RB)/symbol-level RM pattern(s). For example, the RM patterns may include resource patterns which the UE 115 should rate match a downlink channel (e.g., a physical downlink shared channel (PDSCH)) around. In some cases, the UE 115 may rate match around the union of all resources indicated in one or more signaled bitmaps. When the UE 115 is configured with two RM pattern groups, the number of bits in a RM indicator in a DCI may be two (2) bits. Accordingly, a first RM pattern group (e.g., rateMatchPatternGroup1) may correspond to the first bit of the RM indicator, and a second RM pattern group (e.g., rateMatchPatternGroup2) may correspond to the second bit of the RM indicator.

Additionally, in some cases, a trigger for channel state information reference signals (CSI-RSs) (e.g., a zero power CSI-RS (ZP-CSI-RS) trigger) in a downlink scheduling DCI may indicate the RM pattern for the UE 115 to use. For example, a ZP-CSI-RS may be used for downlink channel state information (CSI) acquisition and interference measurement. The ZP-CSI-RS may also mask certain resource elements (REs) to make them unavailable for downlink channel (e.g., PDSCH) transmission. As the name ZP indicates, no data or information may be transmitted in those REs. For example, ZP-CSI-RS resources may prevent downlink channels from being mapped to a set of REs. Therefore, ZP-CSI-RSs may be used to mute REs within a transmission point downlink channel (e.g., from the base station 105) to allow configured CSI interference measurement (CSI-IM) to measure an interference for different hypotheses. In some cases, the ZP-CSI-RS may be configured with a 16-bit bitmap. Each bit may control whether a set of REs should be muted (1) or unmuted (0). For each transmission point, a ZP-CSI-RS configuration may be created from required CSI-IM configurations and the CSI-RS configuration used by the coordinating transmission point.

A UE 115 can be configured with up to four (4) ZP-CSI-RS resource sets (e.g., ZP-CSI-RS-ResourceSet(s)) that provide RE-level rate-matching pattern(s). When the UE 115 is configured with these ZP-CSI-RS resource sets, the number of bits in a ZP-CSI-RS indicator carried in a DCI may be up to two (2) bits. The bit-length of a DCI field for a ZP-CSI-RS trigger may depend on a number of aperiodic ZP-CSI-RS resource sets configured for the UE 115 in the DCI (e.g., up to two (2) bits).

Each non-zero codepoint of the ZP CSI-RS trigger in the DCI (e.g., a DCI format 1_1) may trigger one aperiodic ZP-CSI-RS resource set in a list of aperiodic ZP-CSI-RS resource sets (e.g., aperiodic-ZP-CSI-RS-ResourceSets-ToAddModList) for the UE 115 to add by indicating the aperiodic ZP CSI-RS resource set identifier. For example, a first DCI codepoint (e.g., '01') may trigger a first resource set with a ZP-CSI-RS resource set identifier of one (1) (e.g., ZP-CSI-RS-ResourceSetIds=1), a second DCI codepoint (e.g., '10') may trigger a second resource set with a ZP-CSI-RS resource set identifier of two (2) (e.g., ZP-CSI-RS-ResourceSetIds=2), and a third DCI codepoint (e.g., '11') may trigger a third resource set with a ZP-CSI-RS resource set identifier of three (3) (e.g., ZP-CSI-RS-ResourceSetIds=3). In some cases, a fourth DCI codepoint (e.g., '00') may be reserved for not triggering aperiodic ZP-CSI-RS.

In some cases, a base station 105 may configure and indicate different transmission parameters, such as an RM indicator and/or a ZP-CSI-RS indicator, to a UE 115 in a DCI prior to transmitting downlink messages to the UE 115. If the UE 115 and the base station 105 are communicating according to a carrier aggregation configuration that includes multiple CCs (e.g., or multiple base stations 105 that communicate with the UE 115 on the multiple CCs), the base station 105 may transmit separate DCIs for each CC to configure/indicate transmission parameters specific to each CC (e.g., even if similar transmission parameters are used for each CC). As such, signaling overhead may increase transmitting the separate DCIs for the multiple CCs.

As described herein, the base station 105 and the UE 115 may use a dynamic spectrum sharing (DSS) configuration as part of an enhancement to enable cross-carrier scheduling such that a single DCI can indicate transmission parameters for multiple CCs at once. For example, as part of the DSS configuration for cross-carrier scheduling, a downlink channel (e.g., a physical downlink control channel (PDCCH)) may be received on a secondary cell (SCell) (e.g., or second CC) scheduling a subsequent downlink channel (e.g., PDSCH) or an uplink channel (e.g., physical uplink shared channel (PUSCH) on a primary cell (PCell) or a primary secondary cell (PSCell) (e.g., or a first CC). Additionally or alternatively, as part of the DSS configuration for cross-carrier scheduling, a downlink channel (e.g., PDCCH) may be received on a PCell, PSCell, or SCell that schedules a subsequent downlink channel (e.g., PDSCH) on multiple cells (e.g., multiple CCs, or PCell and SCell) using a single DCI. In some cases, the number of cells that can be scheduled at once may be limited to two (2), and the increase in DCI size may be minimized. Additionally, a total downlink channel blind decoding budget (e.g., PDCCH blind decoding budget) may not be affected with the single DCI. In some cases, these enhancements may not be specific to DSS and may be generally applicable to cross-carrier scheduling in carrier aggregation.

In some cases, multi-CC scheduling may be used to improve spectral efficiency by using a single DCI to configure multiple CCs instead of multiple DCIs corresponding to each CC. Alternatively, multiple DCIs for multi-CC scheduling may be sufficient (e.g., when spectral efficiency is not an issue). Additionally, non-DSS scenarios may be used for purely improving spectral efficiency generally. When using a single DCI for multi-CC scheduling (e.g., using a DCI format 1_1, or 1_2), separate fields may be used (e.g., in the single DCI for multi-CC scheduling, a first field for a first CC and a second field for a second CC are included) or a joint field may be used (e.g., in the single DCI for multi-CC scheduling, the joint field may indicate values for the first CC and the second CC, jointly). However, techniques for indicating different parameters in a single DCI for multi-CC scheduling may yet to be defined.

Wireless communications system 100 may support efficient techniques for a UE 115 to receive a DCI indicating a joint field for at least a first CC and a second CC of a carrier aggregation configuration. For example, the joint field may include a RM indication for the first CC and the second CC, a ZP-CSI-RS indication for the first CC and the second CC, or a combination thereof. Subsequently, the UE 115 may then communicate with a base station based on the DCI and joint field. In some cases, the RM indication may include a common RMR configuration that is applicable for both the first CC and the second CC, per-CC RMR configurations that indicate separate (e.g., or same) RMRs for each of the CCs, or a combination thereof. Additionally, the ZP-CSI-RS indication may include a set identifier that indicates a resource set for ZP-CSI-RS resources that is used for both the first CC and the second CC.

Figure 2:
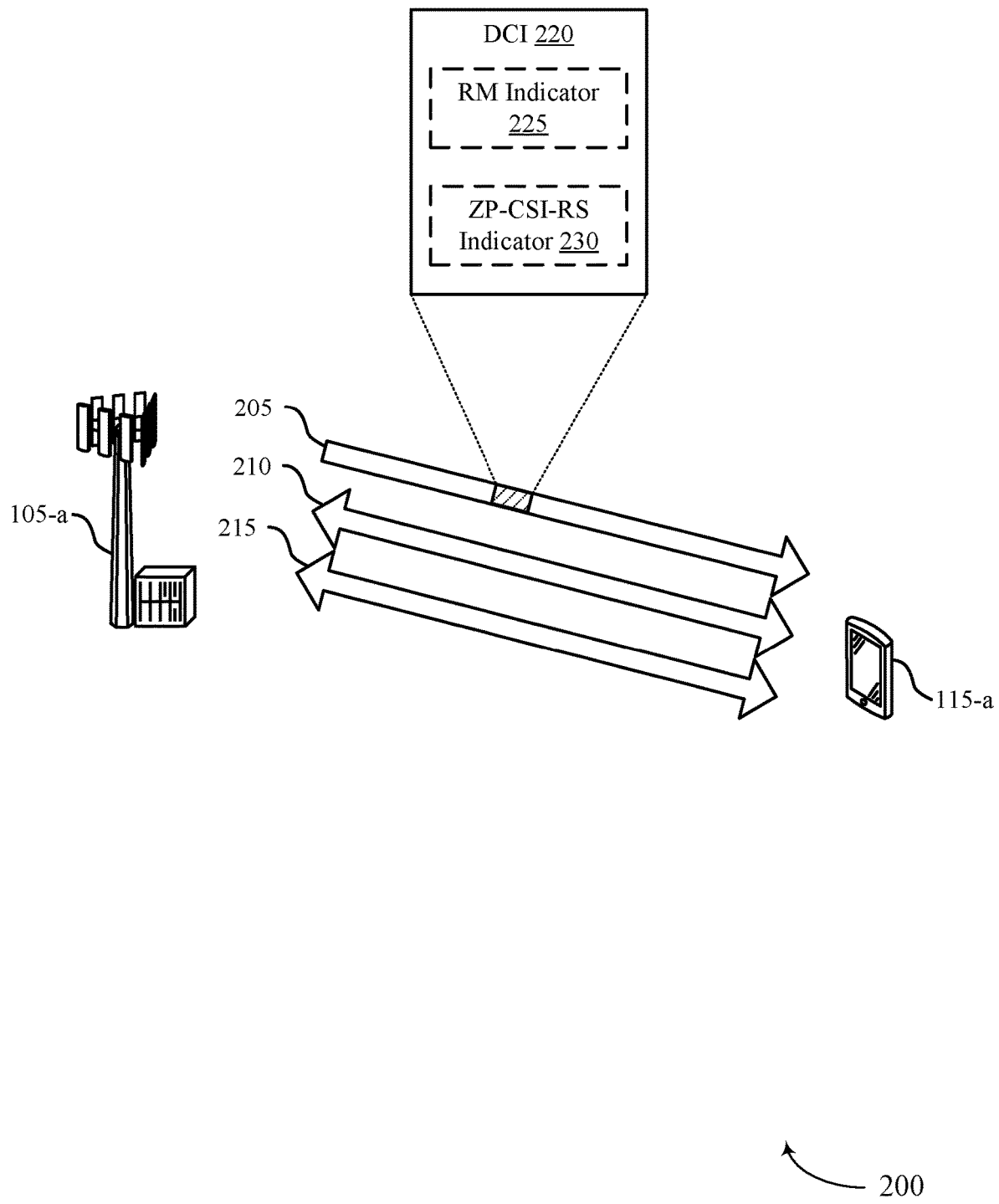
FIG. 2 illustrates an example of a wireless communications system that supports DCI design for multi-CC scheduling in accordance with aspects of the present disclosure.

FIG. 2 illustrates an example of a wireless communications system 200 that supports DCI design for multi-CC scheduling in accordance with aspects of the present disclosure. In some examples, wireless communications system 200 may implement aspects of or may be implemented by aspects of wireless communications system 100. For example, wireless communications system 200 may include a base station 105-a and a UE 115-a, which may be examples of corresponding base stations 105 and UEs 115, respectively, as described with reference to FIG. 1. In some cases, base station 105-a may transmit configuration information to UE 115-a on resources of a carrier 205 for a carrier aggregation configuration that includes a first CC 210 (e.g., for communications with a PCell and/or a PSCell) and a second CC 215 (e.g., for communications with an SCell). Additionally or alternatively, although not shown, the first CC 210 and the second CC 215 may be used for communications with separate base stations 105 as part of the carrier aggregation configuration. In some cases, carrier 205 and the first CC 210 may be a same carrier (e.g., configuration information for UE 115-a is carried on the first CC 210/PCell).

As described herein, wireless communications system 200 may support a DCI design for a multi-CC scheduling configuration to indicate different transmission parameters for the first CC 210 and the second CC 215 in a single DCI. For example, as shown, base station 105-a may transmit a DCI 220 to UE 115-a (e.g., on resources of carrier 205) to indicate an RM indicator 225 and/or a ZP-CSI-RS indicator 230. In some cases, the DCI 220 may include a joint field for the RM indicator 225 and/or the ZP-CSI-RS indicator 230 that configures a respective RMR for each CC and/or a ZP-CSI-RS resource set for each CC.

For example, when the RM indicator 225 includes a joint field for both the first CC 210 and the second CC 215, the single RM joint field may indicate a common RMR for the multi-CC scheduling (e.g., for the first CC 210 and the second CC 215). In some cases, multiple common RMR configurations across the multi-CCs may be provided by higher layer signaling (e.g., RRC signaling) from base station 105-a, and UE 115-a may determine the common RMR from the multiple common RMR configurations based on the joint field. Additionally, base station 105-a may transmit an additional field (e.g., an on/off trigger) for a dynamic-RM of the common RMR across the multi-CC for scheduled downlink channels (e.g., PDSCHs) indicated by the DCI 220 (e.g., or an additional DCI). In some cases, each bit of the joint field may indicate different groups (e.g., RM pattern groups, such as a group 1 or a group 2) configured for UE 115-a as the common RMR configurations for the first CC 210 and the second CC 215.

Additionally or alternatively, when the RM indicator 225 includes a joint field for both the first CC 210 and the second CC 215, the single RM joint field may indicate different RMRs for the first CC 210 and for the second CC 215 (e.g., multi-CCs). In some cases, per-CC RMR configurations for each of the CCs may be provided to UE 115-a (e.g., by base station 105-a, such as by higher layer/RRC signaling), and UE 115-a may determine respective RMRs for each CC based on the per-CC RMR configurations and the joint field. Additionally, base station 105-a may transmit an additional field (e.g., an on/off trigger) for a dynamic-RM of the separate RMRs across the multi-CCs for scheduled downlink channels (e.g., PDSCHs) indicated by the DCI 220 (e.g., or an additional DCI). In some cases, each bit of the joint field may indicate different groups (e.g., RM pattern groups, such as a group 1 or a group 2) configured for UE 115-a for each CC. If there is not a corresponding RM pattern group (e.g., RM group) configured for a CC, UE 115-a may not perform RM on a corresponding downlink channel (e.g., PDSCH) on that CC.

In some cases, when the ZP-CSI-RS indicator 230 includes a joint field for both the first CC 210 and the second CC 215, a DCI codepoint for the ZP-CSI-RS indicator 230 (e.g., 'xx') may trigger a resource set with a corresponding resource set identifier (e.g., ZP-CSI-RS-ResourceSetIds=y) for both the first CC 210 and the second CC 215, respectively. If there is no corresponding ZP-CSI-RS resource set identifier for a CC but the DCI codepoint still indicates a resource set for the CC, UE 115-a may ignore the ZP-CSI-RS trigger (e.g., the ZP-CSI-RS indicator 230) received in the DCI 220. Additionally or alternatively, if there is no corresponding ZP-CSI-RS resource set identifier for a CC but the DCI codepoint still indicates a resource set for the CC, UE 115-a may ignore the ZP-CSI-RS trigger (e.g., the ZP-CSI-RS indicator 230) for the CC without the corresponding resource set but may apply a PDSCH rate matching based on an indicator for the CC with the corresponding resource set.

Additionally or alternatively, the DCI 220 may include separate fields for the RM indicator 225, for the ZP-CSI-RS indicator 230, or both to indicate respective RM pattern groups and/or ZP-CSI-RS resource sets for the first CC 210 and the second CC 215. For example, the DCI 220 may include up to two (2) 0 to 2-bit fields as the RM indicators 225 and/or ZP-CSI-RS indicators 230 for the first CC 210 and the second CC 215, respectively.

Subsequently, after receiving the DCI 220 and determining the corresponding RM parameters and/or ZP-CSI-RS parameters, UE 115-a may communicate with base station 105-a on the first CC 210 and the second CC 215. For example, base station 105-a may transmit one or more downlink messages to UE 115-a on the first CC 210 and the second CC 215. Subsequently, UE 115-a may attempt to receive and decode the downlink messages on the first CC 210 and the second CC 215 based on the RM indicator 225 and/or the ZP-CSI-RS indicator 230 (e.g., indicating the corresponding RM parameters and/or ZP-CSI-RS parameters) indicated in the DCI 220 (e.g., via the joint fields, or separate fields).

Figure 3A:
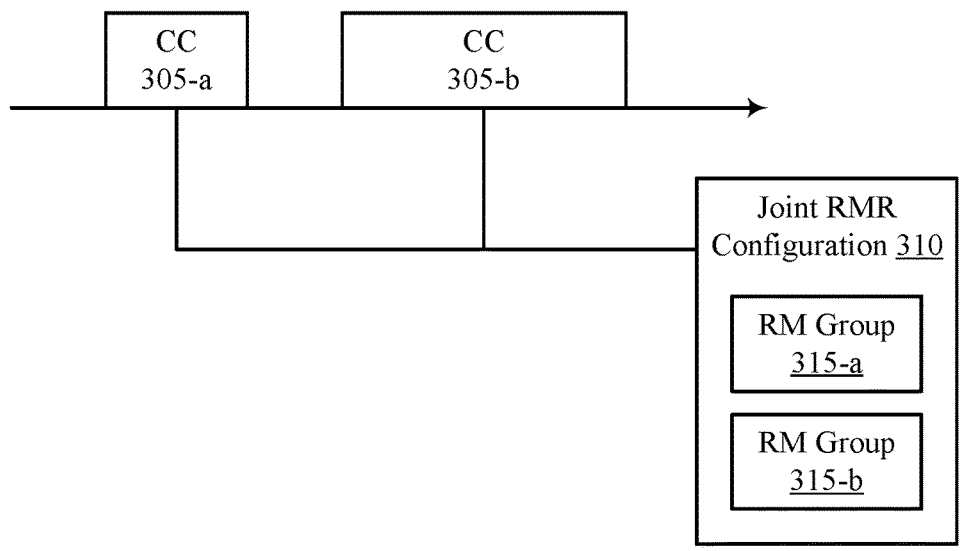
FIGS. 3A and 3B illustrate examples of rate matching (RM) indicators that support DCI design for multi-CC scheduling in accordance with aspects of the present disclosure.
Figure 3B:
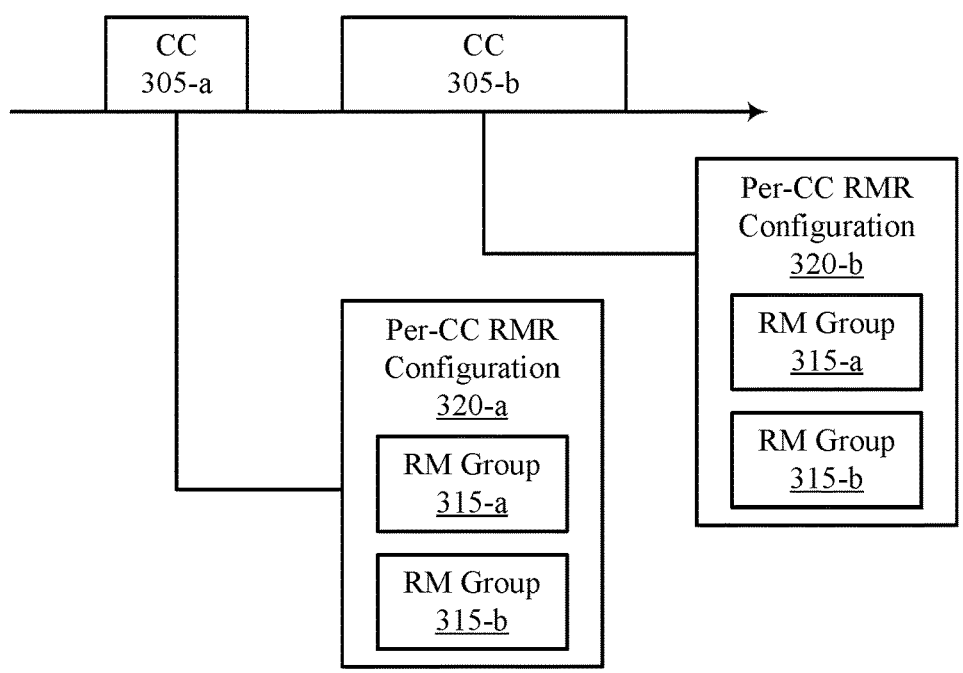

FIGS. 3A and 3B illustrate examples of RM indicators 300 and 301, respectively, that support DCI design for multi-CC scheduling in accordance with aspects of the present disclosure. In some examples, RM indicators 300 and 301 may implement aspects of or may be implemented by aspects of wireless communications system 100, wireless communications system 200, or both. As described with reference to FIG. 2, a base station 105 may transmit a single DCI to configure different transmission parameters, such as RM indicators and ZP-CSI-RS indicators, for multiple CCs at once, where the multiple CCs are used as part of a carrier aggregation configuration for communications between the base station 105 and a UE 115. For example, the base station 105 and the UE 115 may communicate on a first CC 305-a and a second CC 305-b according to the carrier aggregation configuration.

RM indicator 300 may include a joint field that indicates a joint RMR configuration 310 (e.g., JointRM-Config) that indicates different RM groups 315 for each of the CCs 305. For example, each bit of the joint field may indicate the different RM groups 315 (e.g., a group 1 or group 2, such as different RM pattern groups) configured jointly for the CCs 305 (e.g., multi-CCs). That is, a first bit of the joint field may indicate a first RM group 315-a (e.g., RM-group1) from an RM pattern list, and a second bit of the joint field may indicate a second RM group 315-b (e.g., RM-group2) from the RM pattern list. Accordingly, based on which bit is triggered (e.g., which bit has a '1'), the UE 115 may identify which RM group (e.g., RM pattern group) to use for performing RM for both CCs 305 (e.g., a same RM group/ common RMR is used for both CCs 305). In some cases, the RM pattern list may be a set of common RMR configurations indicated by the base station 105 to the UE 115 (e.g., via RRC signaling).

Additionally or alternatively, RM indicator 301 may also include a joint field that indicates different per-CC RMR configurations 320 (e.g., different RMRs) for the CCs 305. For example, each bit of the joint field may indicate the different RM groups 315 (e.g., a group 1 or group 2, such as different RM pattern groups) configured for each CC 305. That is, each CC 305 may be configured with separate per-CC RMR configurations 320 (e.g., PDSCH-Config fields per CC), such as a first per-CC RMR configuration 320-a for the first CC 305-a and a second per-CC RMR configuration 320-b for the second CC 305-b. Accordingly, a first bit of the joint field may indicate a first RM group 315-a (e.g., RM-group1) from an RM pattern list, and a second bit of the joint field may indicate a second RM group 315-b (e.g., RM-group2) from the RM pattern list. However, the first RM group 315-a and the second RM group 315-b may differ from the first CC 305-a to the second CC 305-b based on the per-CC RMR configurations 320, such that different RMRs may be used for each CC 305 while still using a single joint field in the DCI.

Figure 4A:
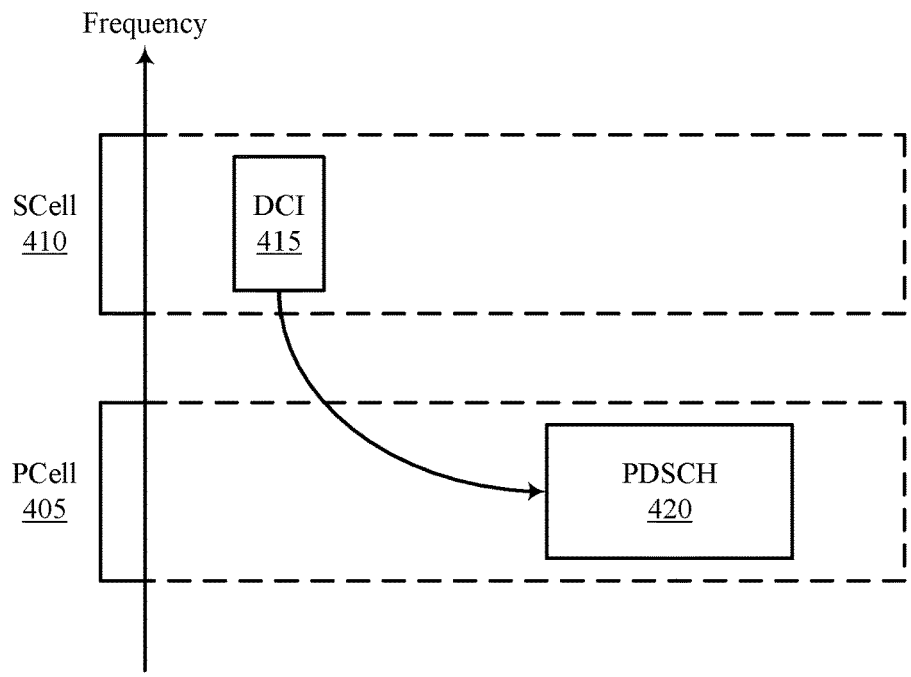
FIGS. 4A and 4B illustrate examples of multi-carrier configurations that support DCI design for multi-CC scheduling in accordance with aspects of the present disclosure.
Figure 4B:
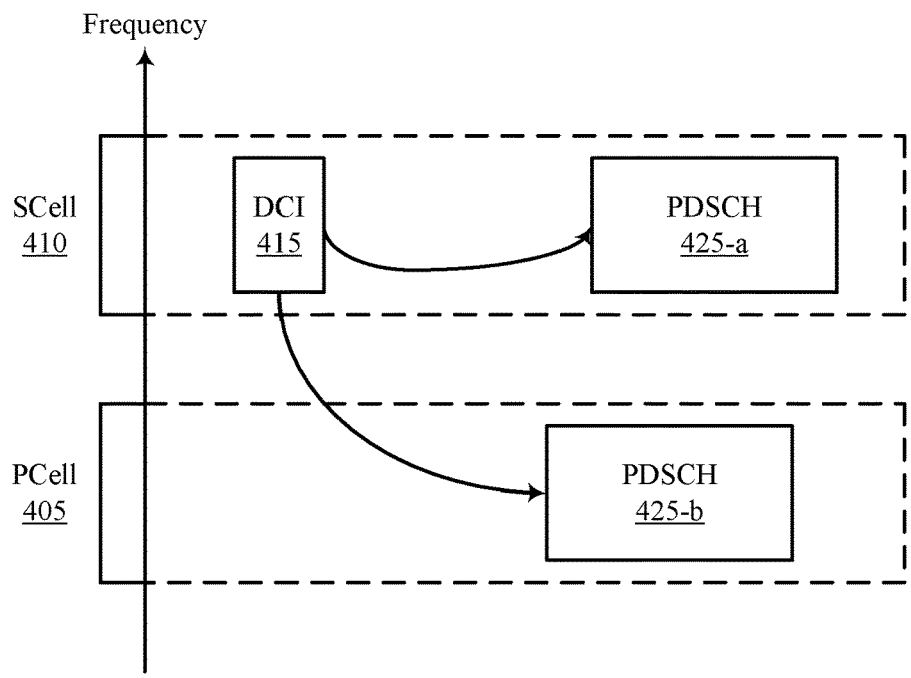

FIGS. 4A and 4B illustrate examples of multi-carrier configurations 400 and 401 in accordance with aspects of the present disclosure. In some examples, multi-carrier configurations 400 and 401 may implement aspects of or may be implemented by aspects of wireless communications system 100, wireless communications system 200, or both. For example, a base station 105 and a UE 115 may communicate according to a carrier aggregation configuration, such that a first CC of the carrier aggregation configuration is used to communicate with a PCell 405 and a second CC of the carrier aggregation configuration is used to communicate with an SCell 410. Additionally or alternatively, the PCell 405 may be a PSCell for use in the communications between the UE 115 and the base station 105. In some cases, the PCell 405 (e.g., or PSCell) and the SCell 410 may be part of a same base station 105 or may be part of different, respective base stations 105.

Additionally, in some cases, the SCell 410 may not use DSS (e.g., non-DSS), and the PCell 405 may use DSS. For example, DSS communications may be used in lower frequency bands (e.g., less than 1 GHz), while non-DSS communications may be used in higher frequency bands (e.g., higher than 3.5 or 4.5 GHz). In some cases, the lower frequency bands may be better suited for communications on the PCell 405 (e.g., and/or PSCell) based on the lower frequency bands being better suited for anchor channels (e.g., for receiving configuration information) or for mobility.

Multi-carrier configuration 400 may illustrate cross-carrier scheduling across the SCell 410 and the PCell 405. For example, the UE 115 may receive a DCI 415 on the SCell 410 that schedules a PDSCH 420 (e.g., or a PUSCH) on the PCell 405. In some cases, the SCell 410 may not include resources for uplink communications, so the UE 115 may be unable to transmit on the SCell 410 but may be able to transmit on the PCell 405. As such, the base station 105 that includes the SCell 410 may indicate for the UE 115 to transmit on the PCell 405 based on signaling in the SCell 410 (e.g., the DCI 415). Additionally or alternatively, while not shown, the UE 115 may receive the DCI 415 on the PCell 405, where the DCI 415 may schedule a subsequent transmission (e.g., PDSCH, or PUSCH) on the SCell 410 as part of the cross-carrier scheduling.

For multi-carrier configuration 401, the UE 115 may receive the DCI 415 on the SCell 410, where the DCI 415 includes joint scheduling for both the PCell 405 and the SCell 410. For example, the DCI 415 may schedule a first PDSCH 425-*a* on the SCell 410 as well as a second PDSCH 425-*b* on the PCell 405. As described herein, the joint scheduling of the DCI 415 may include joint fields to configure different transmission parameters for both the PCell 405 and the SCell 410 (e.g., on respective CCs).

Figure 5:
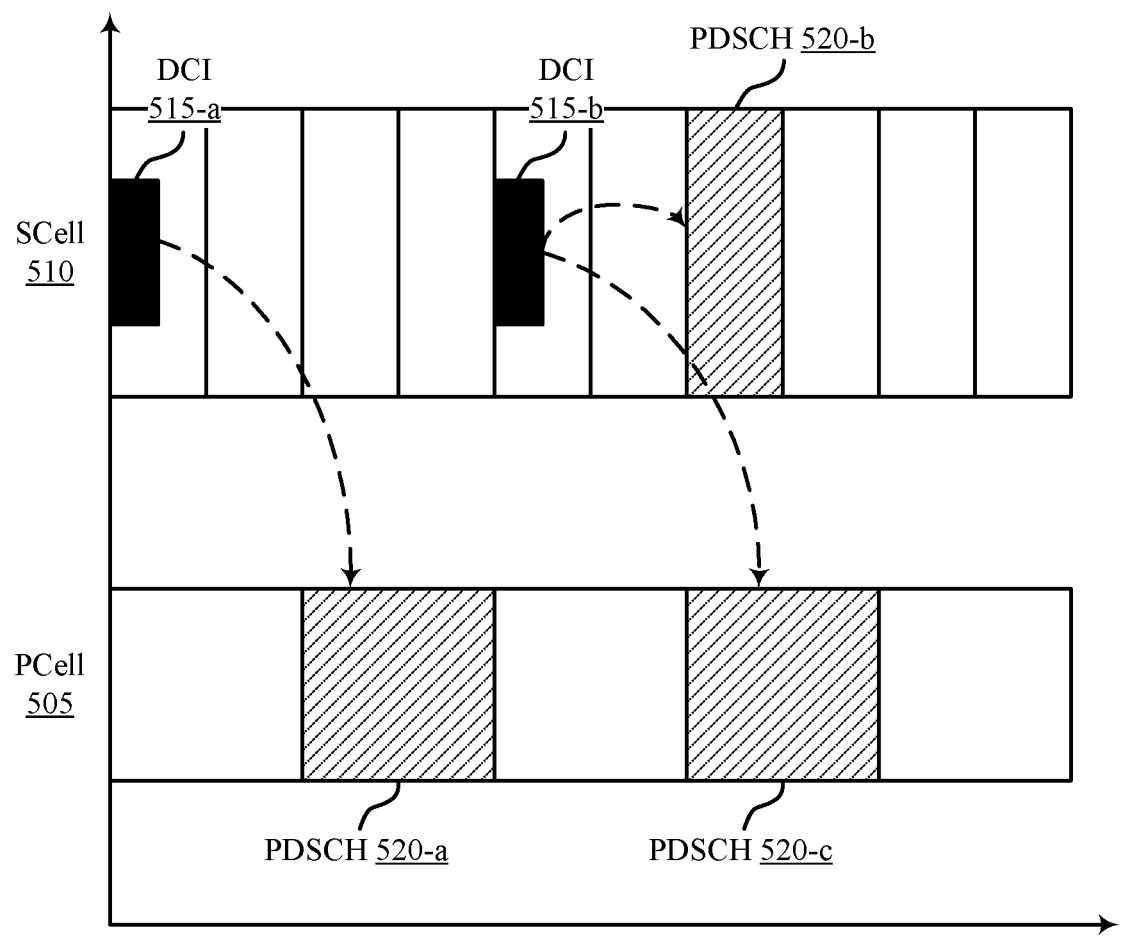
FIG. 5 illustrates an example of a multi-carrier configuration that supports DCI design for multi-CC scheduling in accordance with aspects of the present disclosure.

FIG. 5 illustrates an example of a multi-carrier configuration 500 in accordance with aspects of the present disclosure. In some examples, multi-carrier configuration 500 may implement aspects of or may be implemented by aspects of wireless communications system 100, wireless communications system 200, or both. For example, a base station 105 and a UE 115 may communicate according to a carrier aggregation configuration, such that a first CC of the carrier aggregation configuration is used to communicate with a PCell 505 and a second CC of the carrier aggregation configuration is used to communicate with an SCell 510. Additionally or alternatively, the PCell 505 may be a PSCell for use in the communications between the UE 115 and the base station 105. In some cases, the PCell 505 (e.g., or PSCell) and the SCell 510 may be part of a same base station 105 or may be part of different, respective base stations 105.

In some cases, the PCell 505 (e.g., or PSCell) may be a DSS-carrier using a first subcarrier spacing (SCS) (e.g., 15 kHz), while the SCell 510 may be a non-DSS-carrier using a second SCS greater than the first SCS (e.g., 30 kHz). In some cases, the SCell 510 may use a higher SCS based on using higher frequency bands for the non-DSS-carrier. Additionally, the PCell 505 may include uplink resources, while the SCell 510 may not have uplink resources (e.g., as part of a downlink-only carrier aggregation configuration). In some cases, both the PCell 505 and the SCell 510 may be located in a first frequency range (FR1). Additionally, the SCell 510 (e.g., the non-DSS carrier) may be a carrier in an unlicensed frequency band (e.g., an unlicensed carrier for NR communications, such as an NR-U carrier).

In some cases, cross-carrier scheduling from the SCell 510 to the PCell 505 may include a DCI 515-*a* scheduling a PDSCH 520-*a* (e.g., or a PUSCH) on the PCell 505. Accordingly, this cross-carrier scheduling from the SCell 510 to the PCell 505 may not use (e.g., escape) DCIs from a PDCCH of the PCell 505 to a PDCCH of the SCell 510. Additionally or alternatively, for a multi-CC scheduling (e.g., joint scheduling) may include a DCI 515-*b* received on the SCell 510 that schedules a PDSCH 520-*b* on the SCell 510 and a PDSCH 520-*c* on the PCell 505. Based on this multi-CC scheduling, spectral efficiency may be improved by using a single DCI instead of multiple DCIs.

Figure 6:
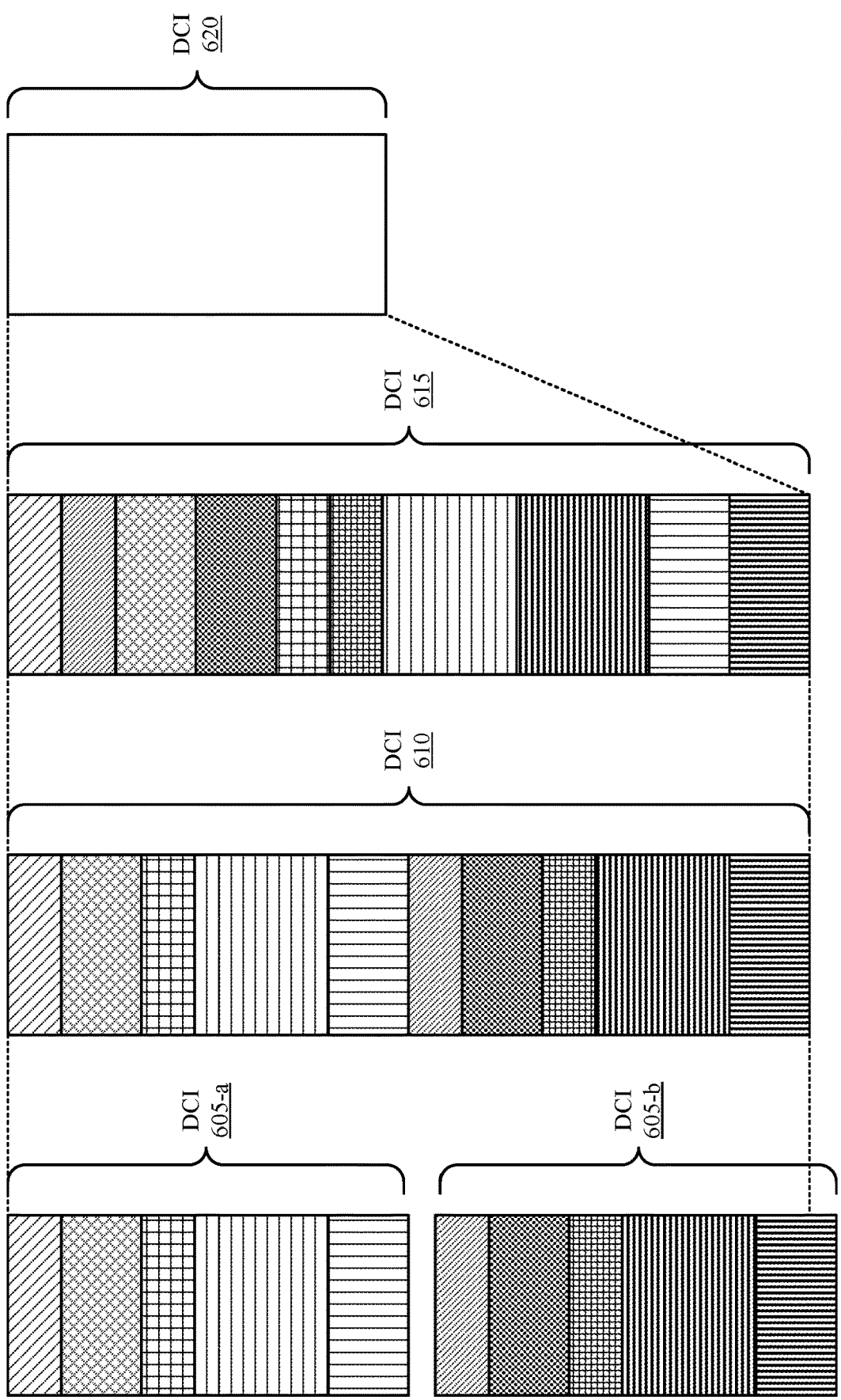
FIG. 6 illustrates an example of a DCI design that supports multi-CC scheduling in accordance with aspects of the present disclosure.

FIG. 6 illustrates an example of a DCI design 600 that supports multi-CC scheduling in accordance with aspects of the present disclosure. In some examples, DCI design 600 may implement aspects of or may be implanted by aspects of wireless communications system 100, wireless communications system 200, or both. For example, a base station 105 may use DCI design 600 to configure transmission parameters for multiple CCs of a carrier aggregation configuration for communications with a UE 115.

In some cases, the base station 105 may transmit a first DCI 605-*a* that includes multiple fields (e.g., five (5) different fields as an example shown in FIG. 6) for a first CC and a second DCI 605-*b* that includes multiple corresponding fields (e.g., five (5) fields) for a second CC. However, transmitting multiple DCIs 605 may increase signaling overhead and reduce spectral efficiency.

Accordingly, the base station 105 may combine the first DCI 605-*a* for the first CC and the second DCI 605-*b* for the second CC into a single DCI 610 that appends the fields of the second DCI 605-*b* for the second CC to the end of the fields for the first DCI 605-*a* for the first CC. Additionally or alternatively, the base station 105 may combine the first DCI 605-*a* for the first CC and the second DCI 605-*b* for the second CC into a single DCI 615 such that corresponding fields of each DCI 605 are transmitted together. For example, for the DCI 615, a first field for the first CC in the first DCI 605-*a* may be transmitted next to a corresponding first field for the second CC in the second DCI 605-*b*, or a second field for the first CC in the first DCI 605-*a* may be transmitted next to a corresponding second field for the second CC in the second DCI 605-*b*. As a note, cyclic redundancy check (CRC) bits may be saved by using the DCI 610 and/or the DCI 615 (e.g., a single DCI as opposed to multiple DCIs).

Additionally, joint indication fields may be used to reduce a DCI size compared to the separate DCIs for the CCs. For example, the size of DCI 610 and the DCI 615 may be smaller than a combined size of the first DCI 605-*a* and the second DCI 605-*b* (e.g., separate DCIs for the CCs). However, the size of DCI 610 and the DCI 615 may still be relatively large and use a higher amount of resources to indicate different configurations for each CC. As such, the base station 105 may use and transmit a DCI 620 that is smaller in size using joint fields as described herein to indicate configurations for each CC in a single DCI.

Figure 7:
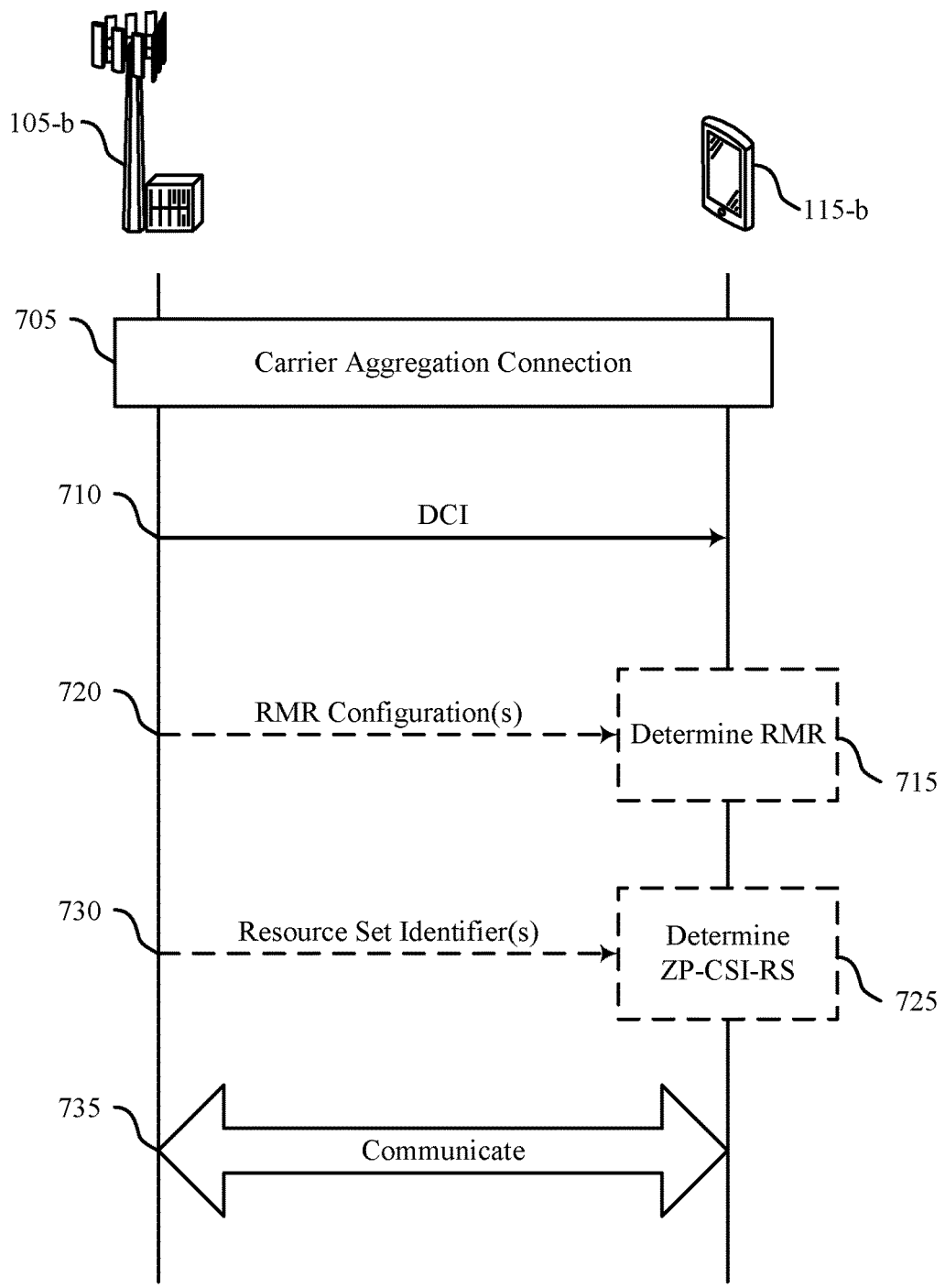
FIG. 7 illustrates an example of a process flow that supports DCI design for multi-CC scheduling in accordance with aspects of the present disclosure.

FIG. 7 illustrates an example of a process flow 700 that supports DCI design for multi-CC scheduling in accordance with aspects of the present disclosure. In some examples, the process flow 700 may implement aspects of or may be implemented by aspects of wireless communications system 100, wireless communications system 200, or both. For example, the process flow 700 may include a UE 115-*b* and a base station 105-*b*, which may be examples of corresponding UEs 115 and base stations 105, respectively, as described with reference to FIGS. 1-6.

In the following description of the process flow 700, the operations between UE 115-*b* and base station 105-*b* may be transmitted in a different order than the order shown, or the operations performed by base station 105-*b* and UE 115-*b* may be performed in different orders or at different times. Certain operations may also be left out of the process flow 700, or other operations may be added to the process flow 700. It is to be understood that while base station 105-*b* and UE 115-*b* are shown performing a number of the operations of the process flow 700, any wireless device may perform the operations shown.

At 705, UE 115-*b* and base station 105-*b* may connect over a first CC and a second CC according to a carrier aggregation configuration.

At 710, UE 115-*b* may receive, from base station 105-*b*, DCI including a joint field that includes one or more of a RM indication for the first CC and the second CC or a zero power reference signal indication for the first CC and the second CC. For example, the RM indication may include a RM pattern group indication, and the zero power reference signal indication may include a ZP-CSI-RS resource set indication.

At 715, UE 115-*b* may determine a common RMR from a set of common RMR configurations for the first CC and the second CC based on the joint field for the RM indication. For example, each bit of the joint field for the RM indication may include an indication of an RMR group configured for the common RMR configurations.

Additionally or alternatively, UE 115-*b* may determine a first RMR for the first CC and a second RMR for the second CC based on the joint field for the RM indication. For example, each bit of the joint field for the RM indication may include an indication of an RMR group configured for each CC of the carrier aggregation configuration. In some cases, UE 115-*b* may determine that a CC of the carrier aggregation configuration is not configured with a corresponding RMR group, and UE 115-*b* may refrain from performing a RM procedure for the CC based on the determination that the corresponding RMR group is not configured for the CC.

In some cases, UE 115-*b* may receive, from base station 105-*b*, an additional field for an additional RM indication for the second CC (e.g., separate fields).

At 720, UE 115-*b* may receive, from base station 105-*b*, an indication of the set of common RMR configurations via RRC signaling. In some cases, UE 115-*b* may also receive, from base station 105-*b*, a trigger field for a dynamic RM of the common RMR for the first CC and the second CC via DCI.

Additionally or alternatively, UE 115-*b* may receive, from base station 105-*b*, an indication of per-CC RMR configurations for each CC of the carrier aggregation configuration, where the first RMR and the second RMR are determined based on the per-CC RMR configurations. In some cases, UE 115-*b* may also receive, from base station 105-*b*, a trigger field for a dynamic RM of the first RMR, the second RMR, or both via DCI.

At 725, UE 115-*b* may determine ZP-CSI-RS indicators for the first CC and the second CC based on the DCI received at 710. For example, UE 115-*b* may receive, from base station 105-*b*, the zero power reference signal indication for the first CC and the second CC. In some cases, UE 115-*b* may receive, from base station 105-*b*, a second additional field for an additional zero power reference signal indication for the second CC (e.g., separate fields).

At 730, UE 115-*b* may receive, from base station 105-*b*, a trigger field for a set identifier associated with the zero power reference signal indication, and UE 115-*b* may determine a resource set (e.g., a ZP-CSI-RS resource set) for the zero power reference signal indication based on the set identifier, where the resource set is used for the first CC and the second CC. In some cases, the trigger field may be received via DCI. Additionally, in some cases, UE 115-*b* may determine that a CC of the carrier aggregation configuration is not configured with a zero power reference signal resource set corresponding to the determined resource set, where the trigger field is ignored for the CC based on the determination that the zero power reference signal resource set is not configured for the CC.

At 735, UE 115-*b* and base station 105-*b* may communicate according to the carrier aggregation configuration based on the DCI that includes the joint field.

Figure 8:
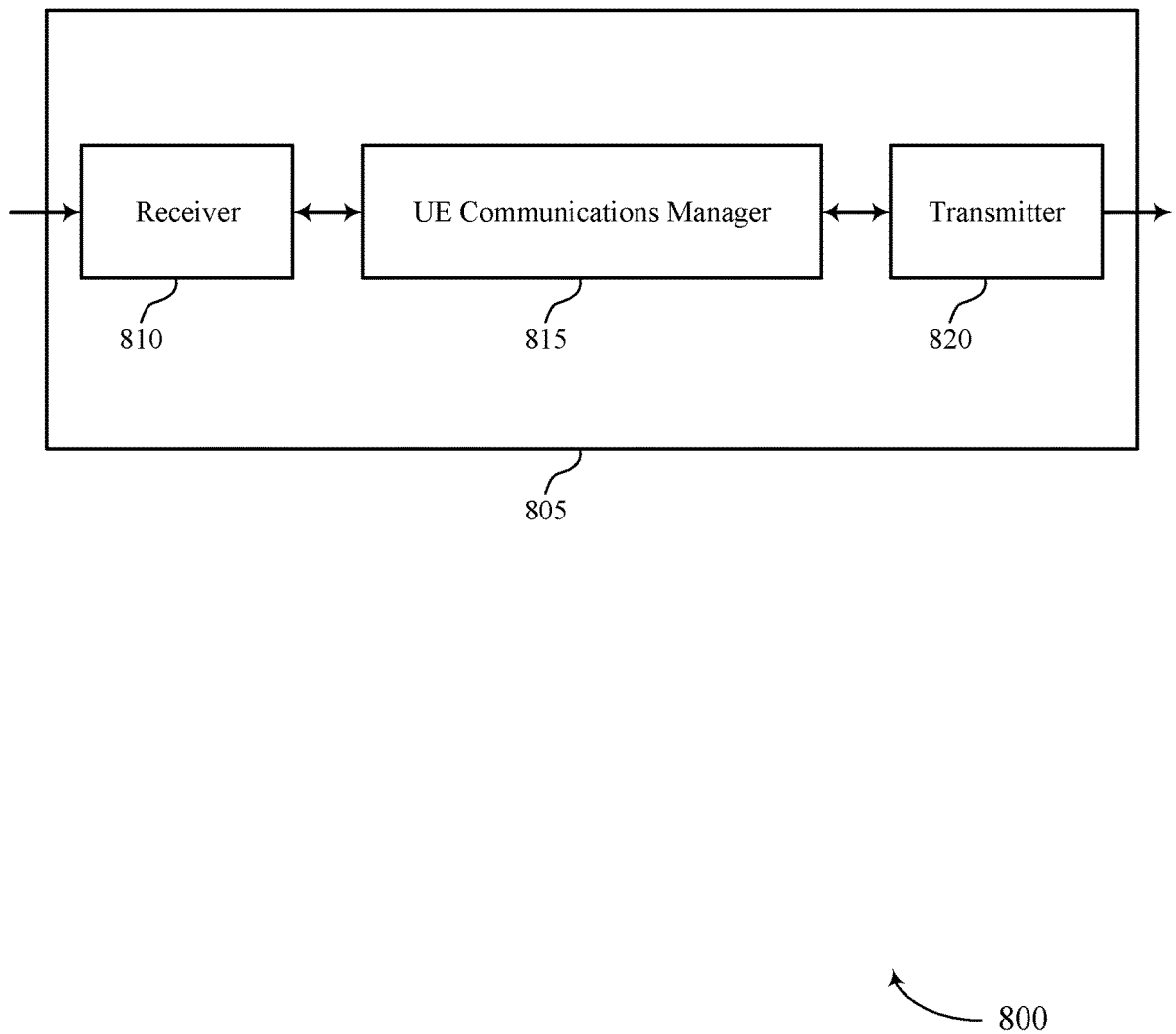
FIGS. 8 and 9 show block diagrams of devices that support DCI design for multi-CC scheduling in accordance with aspects of the present disclosure.

FIG. 8 shows a block diagram 800 of a device 805 that supports DCI design for multi-CC scheduling in accordance with aspects of the present disclosure. The device 805 may be an example of aspects of a UE 115 as described herein. The device 805 may include a receiver 810, a UE communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to DCI design for multi-CC scheduling). Information may be passed on to other components of the device 805. The receiver 810 may be an example of aspects of the transceiver 1120 described with reference to FIG. 11. The receiver 810 may utilize a single antenna or a set of antennas.

The UE communications manager 815 may connect to a base station over a first CC and a second CC according to a carrier aggregation configuration. In some cases, the UE communications manager 815 may receive, from the base station, DCI including a joint field including one or more of: a RM indication for the first CC and the second CC or a zero power reference signal indication for the first CC and the second CC. Additionally, the UE communications manager 815 may communicate with the base station according to the carrier aggregation configuration based on the DCI including the joint field. The UE communications manager 815 may be an example of aspects of the UE communications manager 1110 described herein.

The UE communications manager 815, or its sub-components, may be implemented in hardware, software (e.g., executed by a processor), or any combination thereof. If implemented in code executed by a processor, the functions of the UE communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 815, or its sub-components, may be physically located at various positions, including being distributed such that portions of functions are implemented at different physical locations by one or more physical components. In some examples, the UE communications manager 815, or its sub-components, may be a separate and distinct component in accordance with various aspects of the present disclosure. In some examples, the UE communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
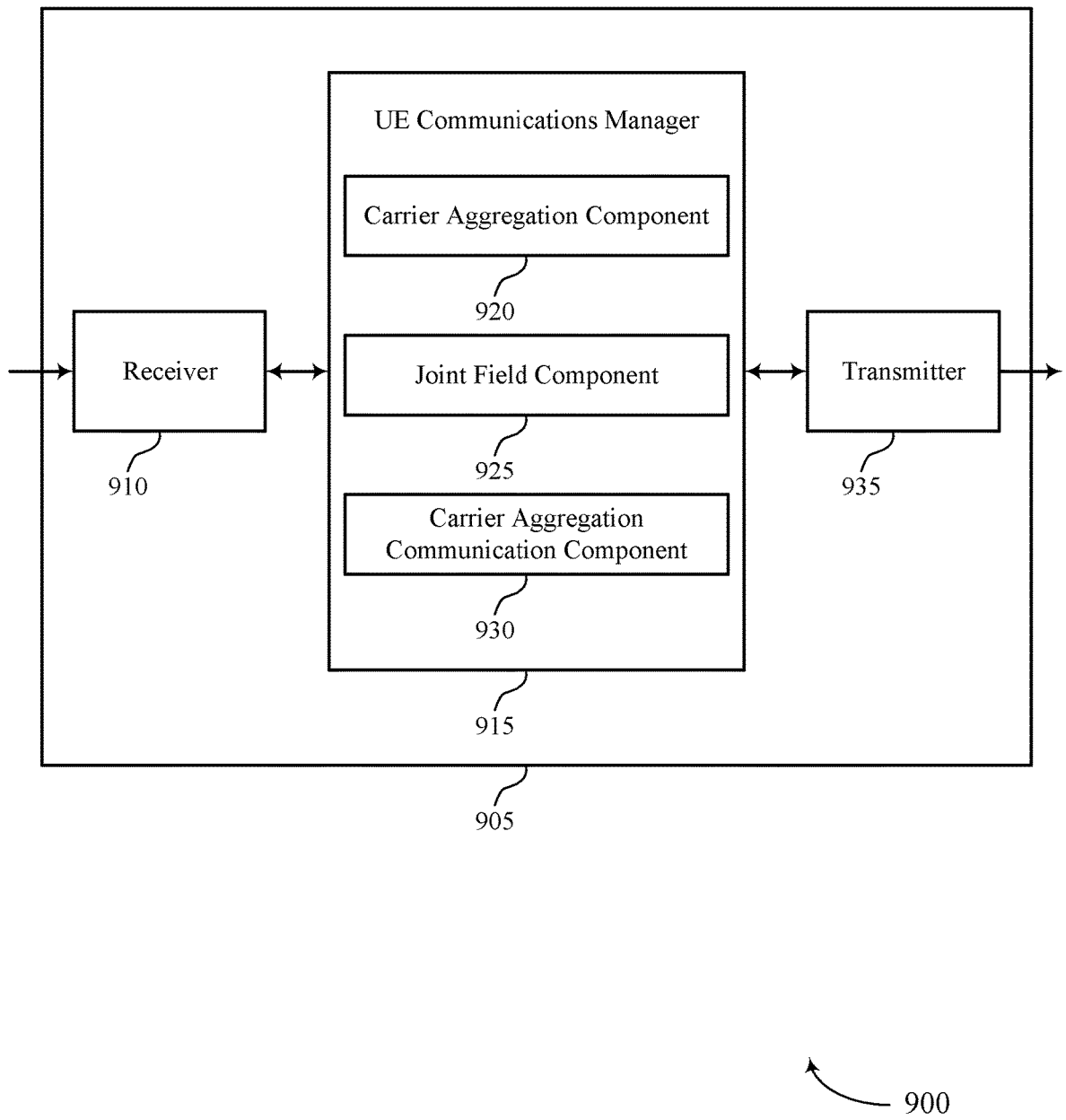

FIG. 9 shows a block diagram 900 of a device 905 that supports DCI design for multi-CC scheduling in accordance with aspects of the present disclosure. The device 905 may be an example of aspects of a device 805, or a UE 115 as described herein. The device 905 may include a receiver 910, a UE communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to DCI design for multi-CC scheduling). Information may be passed on to other components of the device 905. The receiver 910 may be an example of aspects of the transceiver 1120 described with reference to FIG. 11. The receiver 910 may utilize a single antenna or a set of antennas.

The UE communications manager 915 may be an example of aspects of the UE communications manager 815 as described herein. The UE communications manager 915 may include a carrier aggregation component 920, a joint field component 925, and a carrier aggregation communication component 930. The UE communications manager 915 may be an example of aspects of the UE communications manager 1110 described herein.

The carrier aggregation component 920 may connect to a base station over a first CC and a second CC according to a carrier aggregation configuration.

The joint field component 925 may receive, from the base station, DCI including a joint field including one or more of: a RM indication for the first CC and the second CC or a zero power reference signal indication for the first CC and the second CC.

The carrier aggregation communication component 930 may communicate with the base station according to the carrier aggregation configuration based on the DCI including the joint field.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
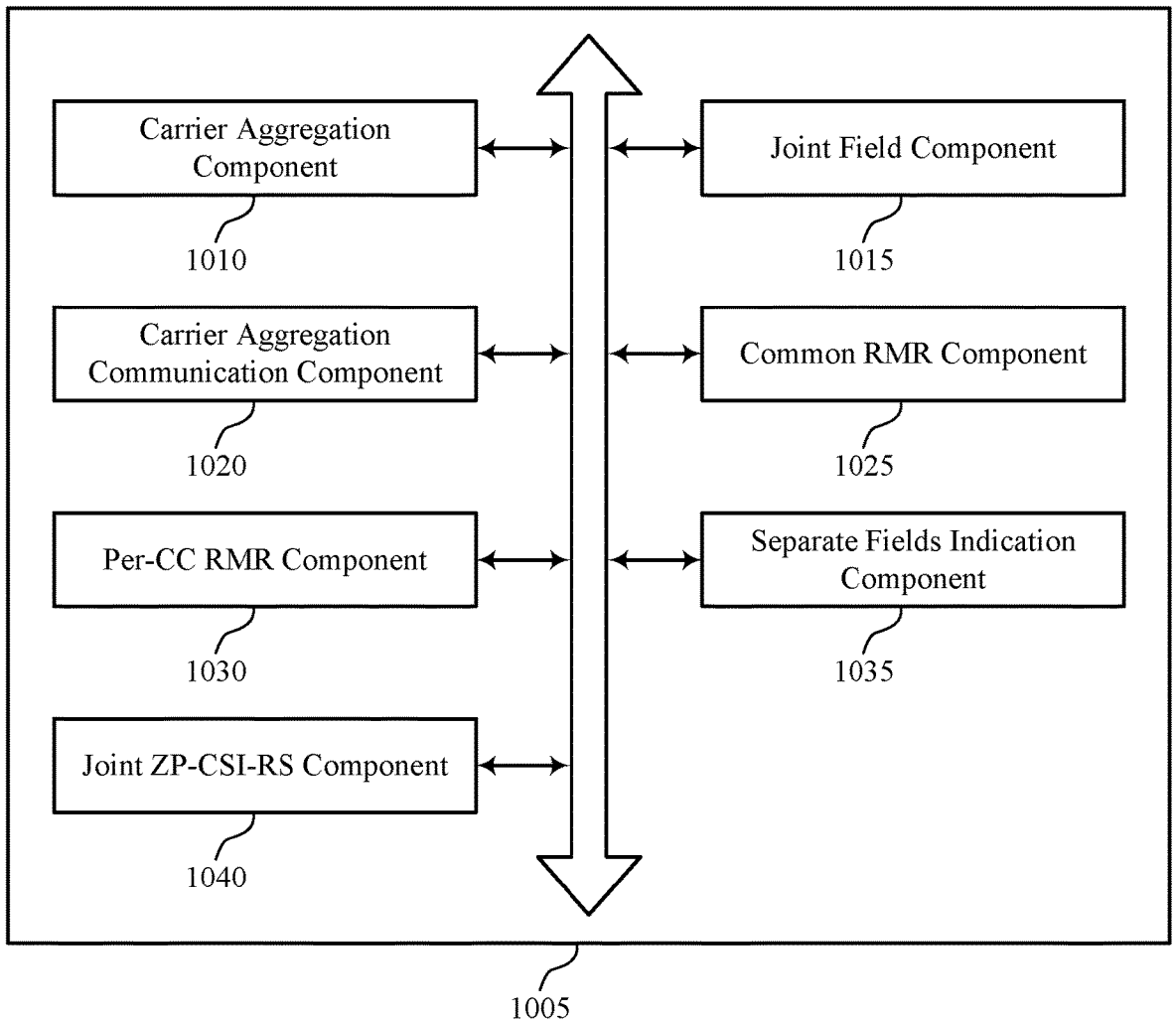
FIG. 10 shows a block diagram of a user equipment (UE) communications manager that supports DCI design for multi-CC scheduling in accordance with aspects of the present disclosure.

FIG. 10 shows a block diagram 1000 of a UE communications manager 1005 that supports DCI design for multi-CC scheduling in accordance with aspects of the present disclosure. The UE communications manager 1005 may be an example of aspects of a UE communications manager 815, a UE communications manager 915, or a UE communications manager 1110 described herein. The UE communications manager 1005 may include a carrier aggregation component 1010, a joint field component 1015, a carrier aggregation communication component 1020, a common RMR component 1025, a per-CC RMR component 1030, a separate fields indication component 1035, and a joint ZP-CSI-RS component 1040. Each of these modules may communicate, directly or indirectly, with one another (e.g., via one or more buses).

The carrier aggregation component 1010 may connect to a base station over a first CC and a second CC according to a carrier aggregation configuration.

The joint field component 1015 may receive, from the base station, DCI including a joint field including one or more of: a RM indication for the first CC and the second CC or a zero power reference signal indication for the first CC and the second CC. In some cases, the zero power reference signal indication may include a ZP-CSI-RS resource set indication, and the RM indication may include a RM pattern group indication.

The carrier aggregation communication component 1020 may communicate with the base station according to the carrier aggregation configuration based on the DCI including the joint field.

The common RMR component 1025 may determine a common RMR from a set of common RMR configurations for the first CC and the second CC based on the joint field for the RM indication. In some examples, the common RMR component 1025 may receive, from the base station, an indication of the set of common RMR configurations via RRC signaling. Additionally, the common RMR component 1025 may receive, from the base station, a trigger field for a dynamic RM of the common RMR for the first CC and the second CC via DCI. In some cases, each bit of the joint field for the RM indication may include an indication of an RMR group configured for the common RMR configurations.

The per-CC RMR component 1030 may determine a first RMR for the first CC and a second RMR for the second CC based on the joint field for the RM indication. In some examples, the per-CC RMR component 1030 may receive, from the base station, an indication of per-CC RMR configurations for each CC of the carrier aggregation configuration, where the first RMR and the second RMR are determined based on the per-CC RMR configurations. Additionally, the per-CC RMR component 1030 may receive, from the base station, a trigger field for a dynamic RM of the first RMR, the second RMR, or both via DCI. In some examples, the per-CC RMR component 1030 may determine that a CC of the carrier aggregation configuration is not configured with a corresponding RMR group and may refrain from performing a RM procedure for the CC based on the determination that the corresponding RMR group is not configured for the CC. In some cases, each bit of the joint field for the RM indication may include an indication of an RMR group configured for each CC of the carrier aggregation configuration.

The separate fields indication component 1035 may receive, from the base station, an additional field for an additional RM indication for the second CC, where communications with the base station are based on the additional RM indication. Additionally or alternatively, the separate fields indication component 1035 may receive, from the base station, a second additional field for an additional zero power reference signal indication for the second CC.

The joint ZP-CSI-RS component 1040 may determine, from the base station, a zero power reference signal configuration for the first CC and the second CC based on the joint field for the zero power reference signal indication. In some examples, the joint ZP-CSI-RS component 1040 may receive, from the base station, a trigger field for a set identifier associated with the zero power reference signal indication and may determine a resource set for the zero power reference signal indication based on the set identifier, where the resource set is used for the first CC and the second CC. In some cases, the trigger field may be received via DCI. In some examples, the joint ZP-CSI-RS component 1040 may determine that a CC of the carrier aggregation configuration is not configured with a zero power reference signal resource set corresponding to the determined resource set, where the trigger field is ignored for the CC based on the determination that the zero power reference signal resource set is not configured for the CC.

Figure 11:
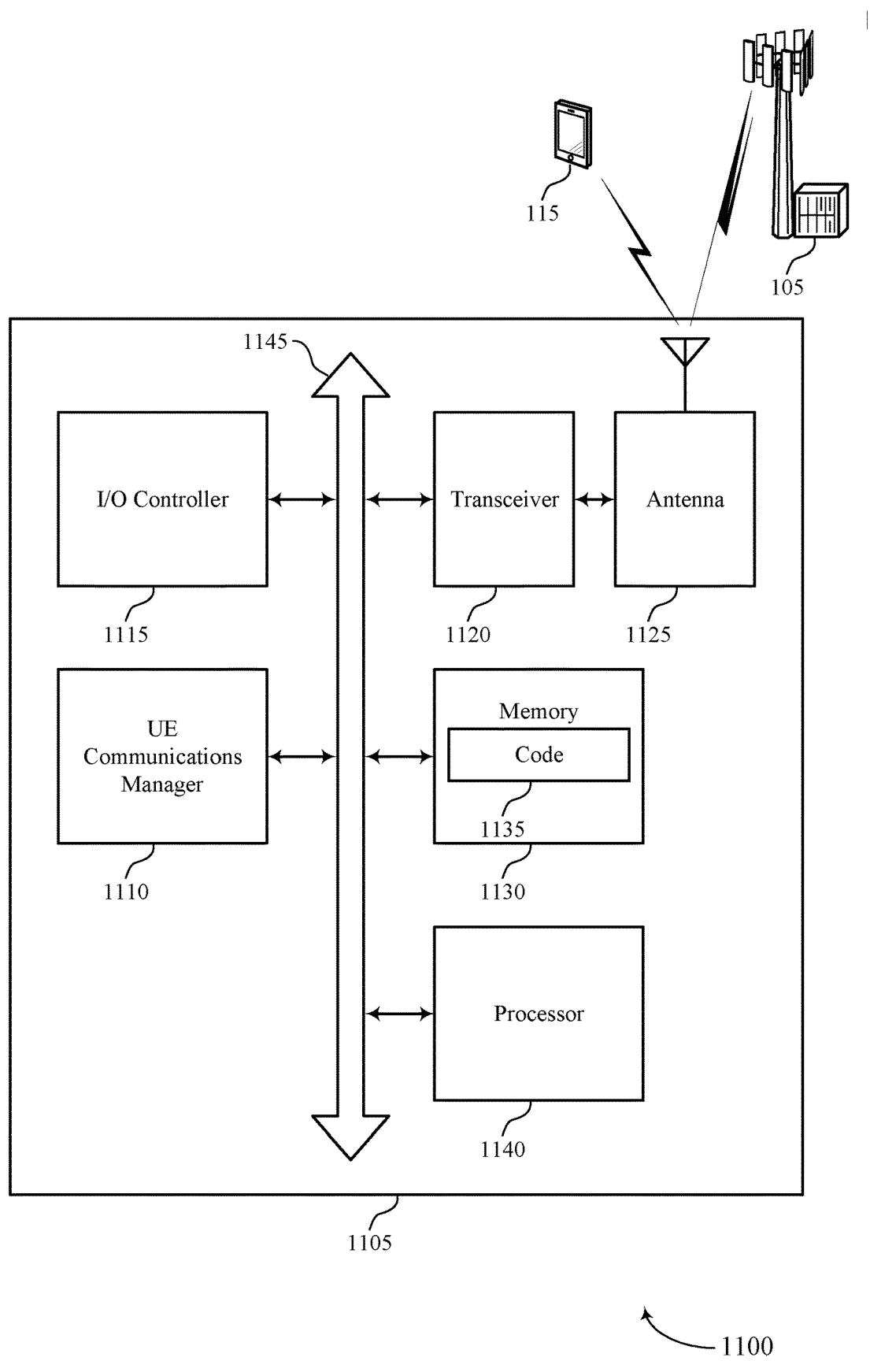
FIG. 11 shows a diagram of a system including a device that supports DCI design for multi-CC scheduling in accordance with aspects of the present disclosure.

FIG. 11 shows a diagram of a system 1100 including a device 1105 that supports DCI design for multi-CC scheduling in accordance with aspects of the present disclosure. The device 1105 may be an example of or include the components of device 805, device 905, or a UE 115 as described herein. The device 1105 may include components for bi-directional voice and data communications including components for transmitting and receiving communications, including a UE communications manager 1110, an I/O controller 1115, a transceiver 1120, an antenna 1125, memory 1130, and a processor 1140. These components may be in electronic communication via one or more buses (e.g., bus 1145).

The UE communications manager 1110 may connect to a base station over a first CC and a second CC according to a carrier aggregation configuration. In some cases, the UE communications manager 1110 may receive, from the base station, DCI including a joint field including one or more of: a RM indication for the first CC and the second CC or a zero power reference signal indication for the first CC and the second CC. Additionally, the UE communications manager 1110 may communicate with the base station according to the carrier aggregation configuration based on the DCI including the joint field.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting DCI design for multi-CC scheduling).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
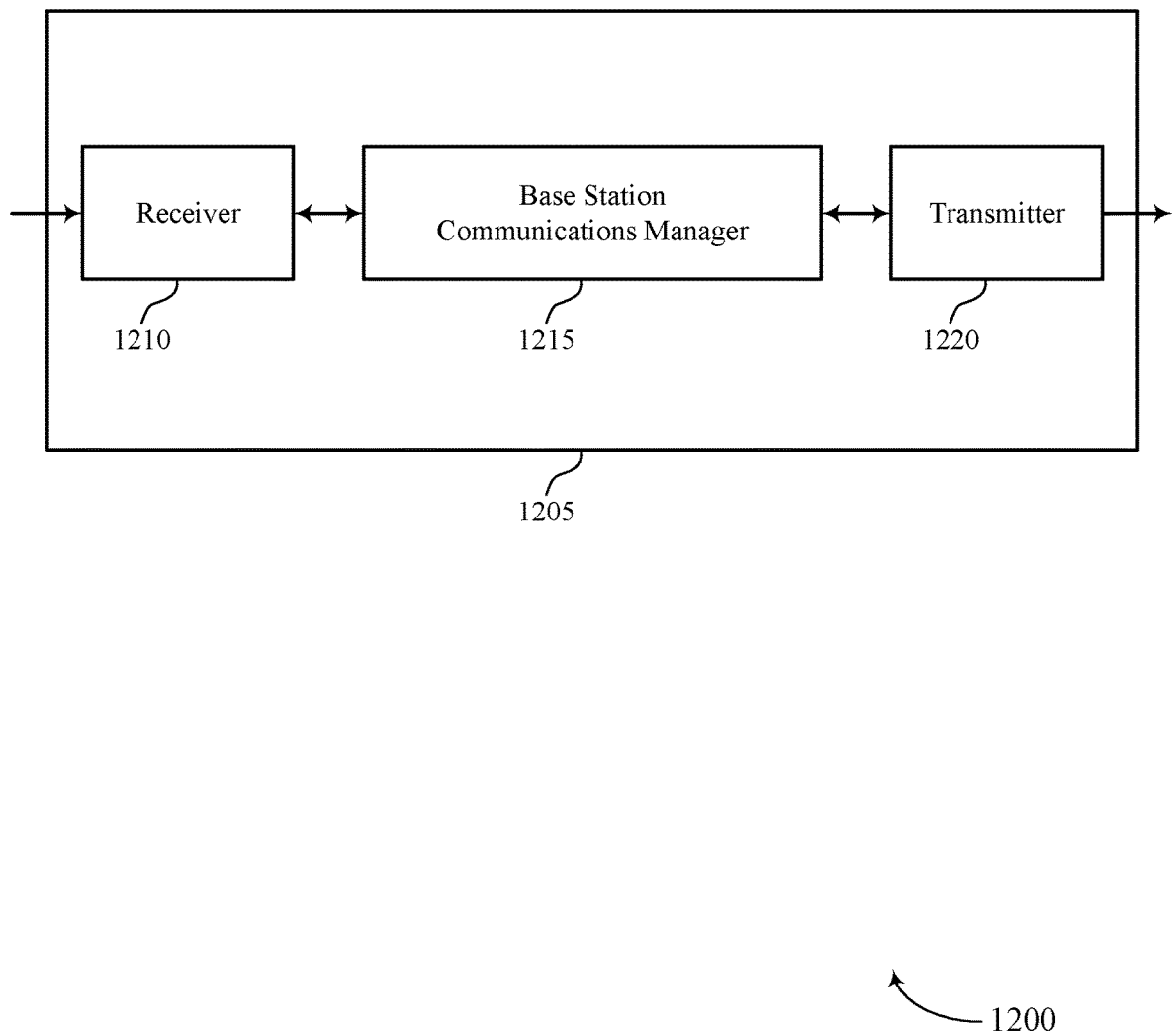
FIGS. 12 and 13 show block diagrams of devices that support DCI design for multi-CC scheduling in accordance with aspects of the present disclosure.

FIG. 12 shows a block diagram 1200 of a device 1205 that supports DCI design for multi-CC scheduling in accordance with aspects of the present disclosure. The device 1205 may be an example of aspects of a base station 105 as described herein. The device 1205 may include a receiver 1210, a base station communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to DCI design for multi-CC scheduling). Information may be passed on to other components of the device 1205. The receiver 1210 may be an example of aspects of the transceiver 1520 described with reference to FIG. 15. The receiver 1210 may utilize a single antenna or a set of antennas.

The base station communications manager 1215 may connect to a UE over a first CC and a second CC according to a carrier aggregation configuration. In some cases, the base station communications manager 1215 may transmit, to the UE, DCI including a joint field including one or more of: a RM indication for the first CC and the second CC or a zero power reference signal indication for the first CC and the second CC. Additionally, the base station communications manager 1215 may communicate with the UE according to the carrier aggregation configuration based on the DCI including the joint field. The base station communications manager 1215 may be an example of aspects of the base station communications manager 1510 described herein.

The base station communications manager 1215, or its sub-components, may be implemented in hardware, software (e.g., executed by a processor), or any combination thereof. If implemented in code executed by a processor, the functions of the base station communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1215, or its sub-components, may be physically located at various positions, including being distributed such that portions of functions are implemented at different physical locations by one or more physical components. In some examples, the base station communications manager 1215, or its sub-components, may be a separate and distinct component in accordance with various aspects of the present disclosure. In some examples, the base station communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
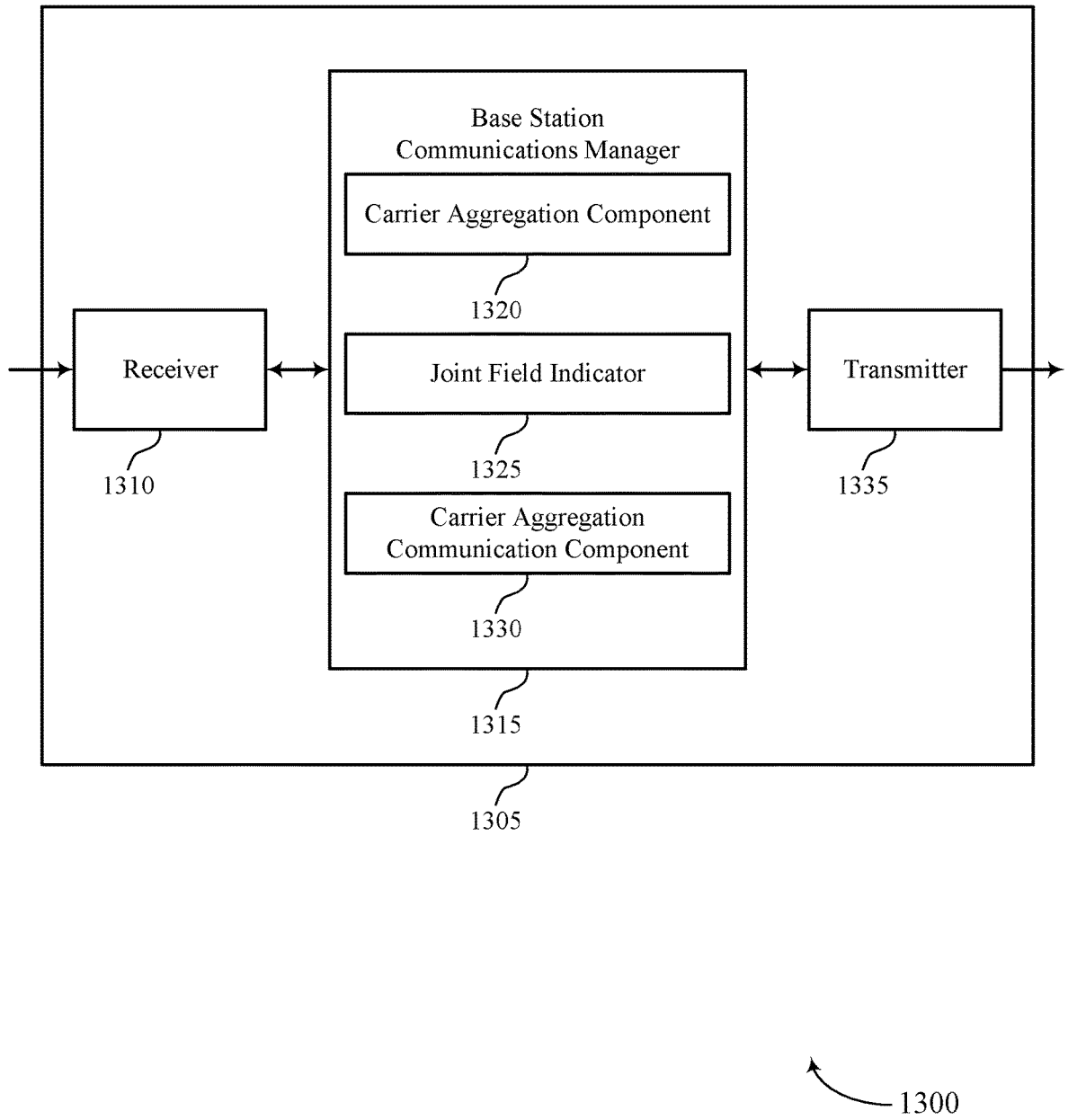

FIG. 13 shows a block diagram 1300 of a device 1305 that supports DCI design for multi-CC scheduling in accordance with aspects of the present disclosure. The device 1305 may be an example of aspects of a device 1205, or a base station 105 as described herein. The device 1305 may include a receiver 1310, a base station communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to DCI design for multi-CC scheduling). Information may be passed on to other components of the device 1305. The receiver 1310 may be an example of aspects of the transceiver 1520 described with reference to FIG. 15. The receiver 1310 may utilize a single antenna or a set of antennas.

The base station communications manager 1315 may be an example of aspects of the base station communications manager 1215 as described herein. The base station communications manager 1315 may include a carrier aggregation component 1320, a joint field indicator 1325, and a carrier aggregation communication component 1330. The base station communications manager 1315 may be an example of aspects of the base station communications manager 1510 described herein.

The carrier aggregation component 1320 may connect to a UE over a first CC and a second CC according to a carrier aggregation configuration.

The joint field indicator 1325 may transmit, to the UE, DCI including a joint field including one or more of: a RM indication for the first CC and the second CC or a zero power reference signal indication for the first CC and the second CC.

The carrier aggregation communication component 1330 may communicate with the UE according to the carrier aggregation configuration based on the DCI including the joint field.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
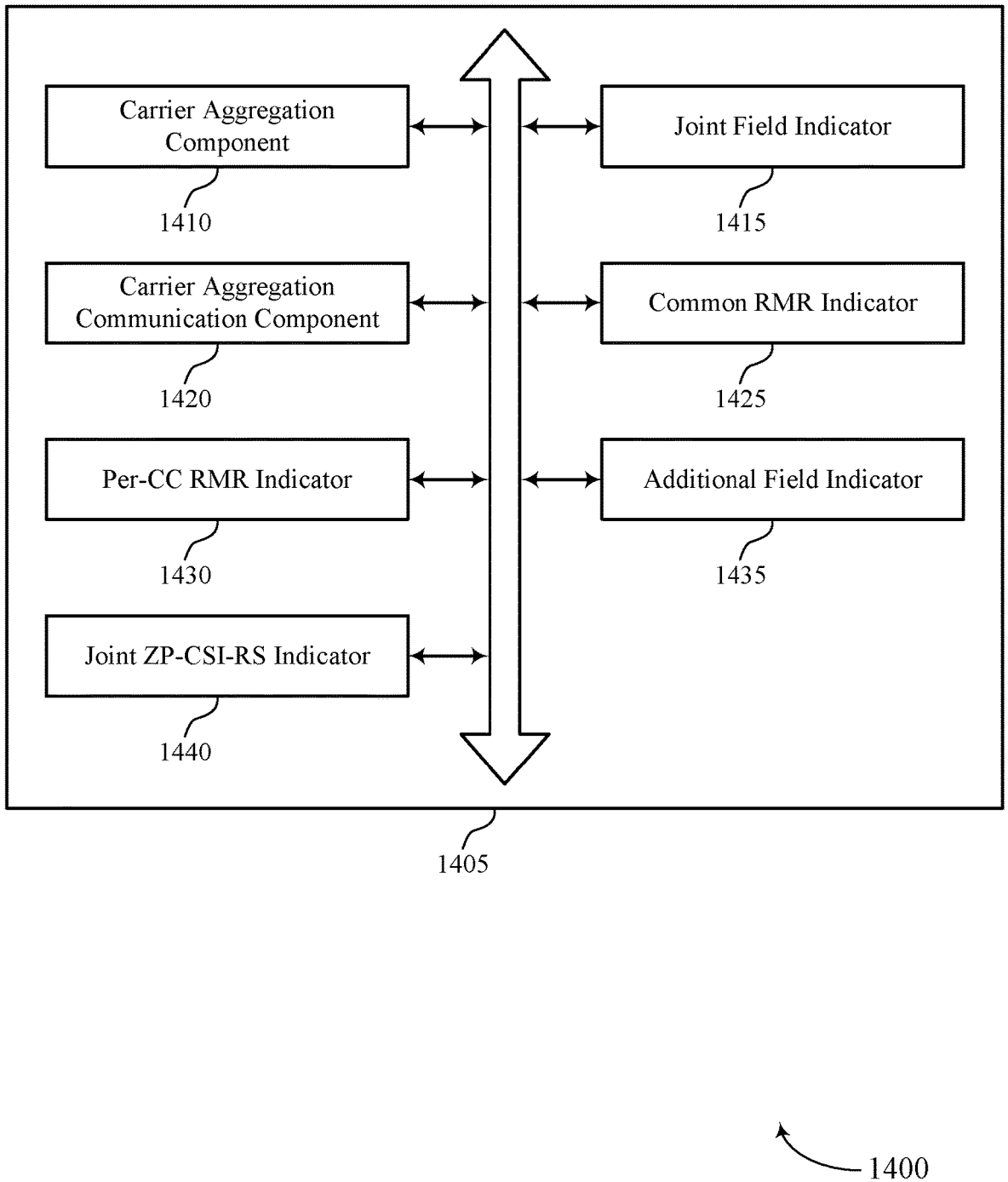
FIG. 14 shows a block diagram of a base station communications manager that supports DCI design for multi-CC scheduling in accordance with aspects of the present disclosure.

FIG. 14 shows a block diagram 1400 of a base station communications manager 1405 that supports DCI design for multi-CC scheduling in accordance with aspects of the present disclosure. The base station communications manager 1405 may be an example of aspects of a base station communications manager 1215, a base station communications manager 1315, or a base station communications manager 1510 described herein. The base station communications manager 1405 may include a carrier aggregation component 1410, a joint field indicator 1415, a carrier aggregation communication component 1420, a common RMR indicator 1425, a per-CC RMR indicator 1430, an additional field indicator 1435, and a joint ZP-CSI-RS indicator 1440. Each of these modules may communicate, directly or indirectly, with one another (e.g., via one or more buses).

The carrier aggregation component 1410 may connect to a UE over a first CC and a second CC according to a carrier aggregation configuration.

The joint field indicator 1415 may transmit, to the UE, DCI including a joint field including one or more of: a RM indication for the first CC and the second CC or a zero power reference signal indication for the first CC and the second CC. In some cases, the zero power reference signal indication may include a ZP-CSI-RS resource set indication, and the RM indication may include a RM pattern group indication.

The carrier aggregation communication component 1420 may communicate with the UE according to the carrier aggregation configuration based on the DCI including the joint field.

The common RMR indicator 1425 may transmit, in the joint field for the RM indication, an indication of a common RMR from a set of common RMR configurations for the first CC and the second CC. In some examples, the common RMR indicator 1425 may transmit, to the UE, an indication of the set of common RMR configurations via RRC signaling. Additionally, the common RMR indicator 1425 may transmit, to the UE, a trigger field for a dynamic RM of the common RMR for the first CC and the second CC via DCI. In some cases, each bit of the joint field for the RM indication may include an indication of an RMR group configured for the common RMR configurations.

The per-CC RMR indicator 1430 may transmit, in the joint field for the RM indication, a first RMR for the first CC and a second RMR for the second CC. In some examples, the per-CC RMR indicator 1430 may transmit, to the UE, an indication of per-CC RMR configurations for each CC of the carrier aggregation configuration, where the first RMR and the second RMR are determined based on the per-CC RMR configurations. Additionally, the per-CC RMR indicator 1430 may transmit, to the UE, a trigger field for a dynamic RM of the first RMR, the second RMR, or both via DCI. In some cases, each bit of the joint field for the RM indication may include an indication of an RMR group configured for each CC of the carrier aggregation configuration.

The additional field indicator 1435 may transmit, to the UE, an additional field for an additional RM indication for the second CC, where communications with the UE are based on the additional RM indication. Additionally or alternatively, the additional field indicator 1435 may transmit, to the UE, a second additional field for an additional zero power reference signal indication for the second CC.

The joint ZP-CSI-RS indicator 1440 may transmit, to the UE, a zero power reference signal configuration for the first CC and the second CC based on the zero power reference signal indication in the joint field of the DCI. In some examples, the joint ZP-CSI-RS indicator 1440 may determine a resource set for the zero power reference signal indication, where the resource set is used for the first CC and the second CC and may transmit, to the UE, a trigger field for a set identifier associated with the zero power reference signal indication, the set identifier corresponding to the determined resource set. In some cases, the trigger field may be transmitted via DCI.

Figure 15:
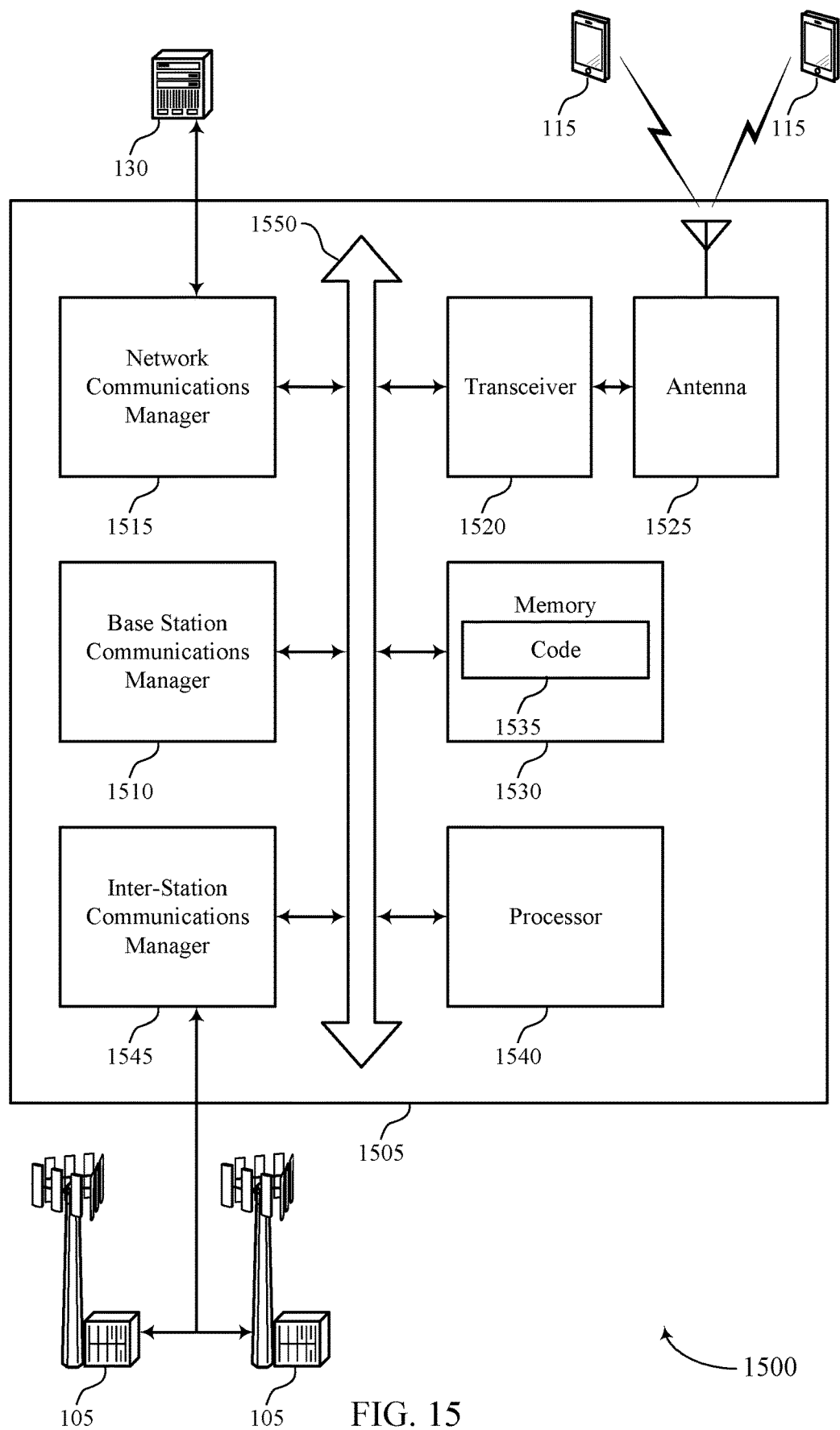
FIG. 15 shows a diagram of a system including a device that supports DCI design for multi-CC scheduling in accordance with aspects of the present disclosure.

FIG. 15 shows a diagram of a system 1500 including a device 1505 that supports DCI design for multi-CC scheduling in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a base station communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The base station communications manager 1510 may connect to a UE over a first CC and a second CC according to a carrier aggregation configuration. In some cases, the base station communications manager 1510 may transmit, to the UE, DCI including a joint field including one or more of: a RM indication for the first CC and the second CC or a zero power reference signal indication for the first CC and the second CC. Additionally, the base station communications manager 1510 may communicate with the UE according to the carrier aggregation configuration based on the DCI including the joint field.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting DCI design for multi-CC scheduling).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
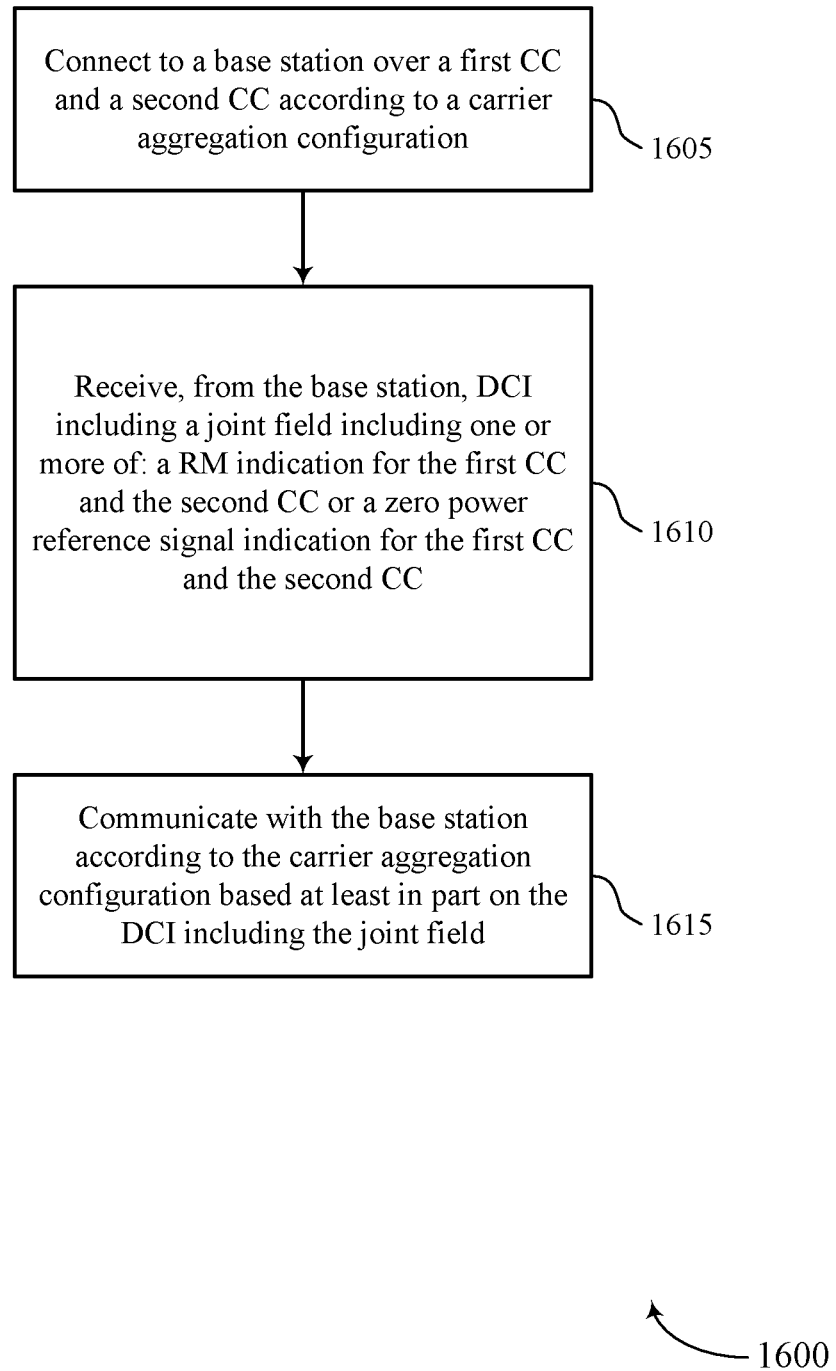
FIGS. 16 through 20 show flowcharts illustrating methods that support DCI design for multi-CC scheduling in accordance with aspects of the present disclosure.

FIG. 16 shows a flowchart illustrating a method 1600 that supports DCI design for multi-CC scheduling in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may connect to a base station over a first CC and a second CC according to a carrier aggregation configuration. The operations of 1605 may be performed according to the methods described herein. In some examples, aspects of the operations of 1605 may be performed by a carrier aggregation component as described with reference to FIGS. 8 through 11.

At 1610, the UE may receive, from the base station, DCI including a joint field including one or more of: a RM indication for the first CC and the second CC or a zero power reference signal indication for the first CC and the second CC. The operations of 1610 may be performed according to the methods described herein. In some examples, aspects of the operations of 1610 may be performed by a joint field component as described with reference to FIGS. 8 through 11.

At 1615, the UE may communicate with the base station according to the carrier aggregation configuration based at least in part on the DCI including the joint field. The operations of 1615 may be performed according to the methods described herein. In some examples, aspects of the operations of 1615 may be performed by a carrier aggregation communication component as described with reference to FIGS. 8 through 11.

Figure 17:
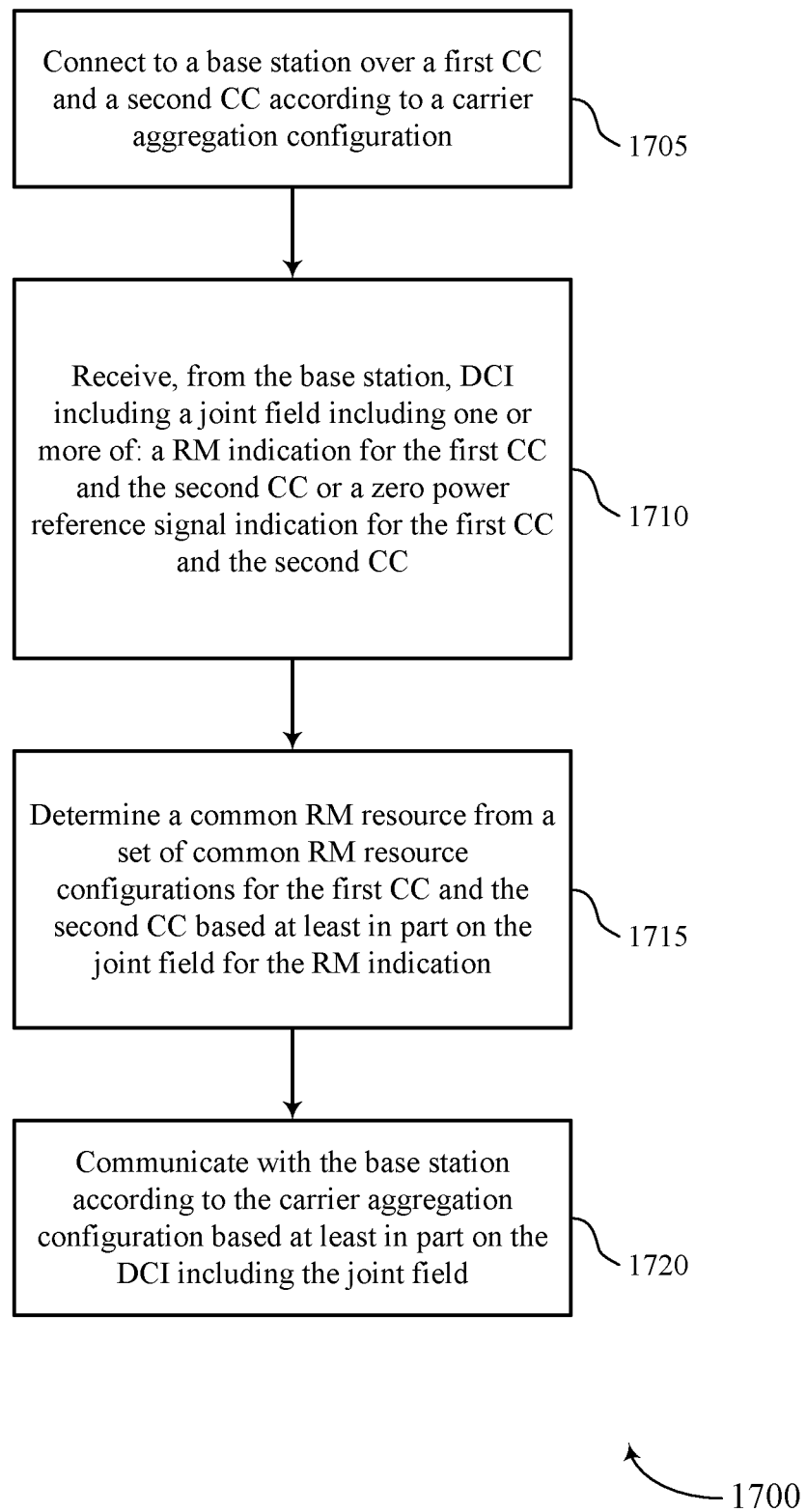

FIG. 17 shows a flowchart illustrating a method 1700 that supports DCI design for multi-CC scheduling in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may connect to a base station over a first CC and a second CC according to a carrier aggregation configuration. The operations of 1705 may be performed according to the methods described herein. In some examples, aspects of the operations of 1705 may be performed by a carrier aggregation component as described with reference to FIGS. 8 through 11.

At 1710, the UE may receive, from the base station, DCI including a joint field including one or more of: a RM indication for the first CC and the second CC or a zero power reference signal indication for the first CC and the second CC. The operations of 1710 may be performed according to the methods described herein. In some examples, aspects of the operations of 1710 may be performed by a joint field component as described with reference to FIGS. 8 through 11.

At 1715, the UE may determine a common RMR from a set of common RMR configurations for the first CC and the second CC based at least in part on the joint field for the RM indication. The operations of 1715 may be performed according to the methods described herein. In some examples, aspects of the operations of 1715 may be performed by a common RMR component as described with reference to FIGS. 8 through 11.

At 1720, the UE may communicate with the base station according to the carrier aggregation configuration based at least in part on the DCI including the joint field. The operations of 1720 may be performed according to the methods described herein. In some examples, aspects of the operations of 1720 may be performed by a carrier aggregation communication component as described with reference to FIGS. 8 through 11.

Figure 18:
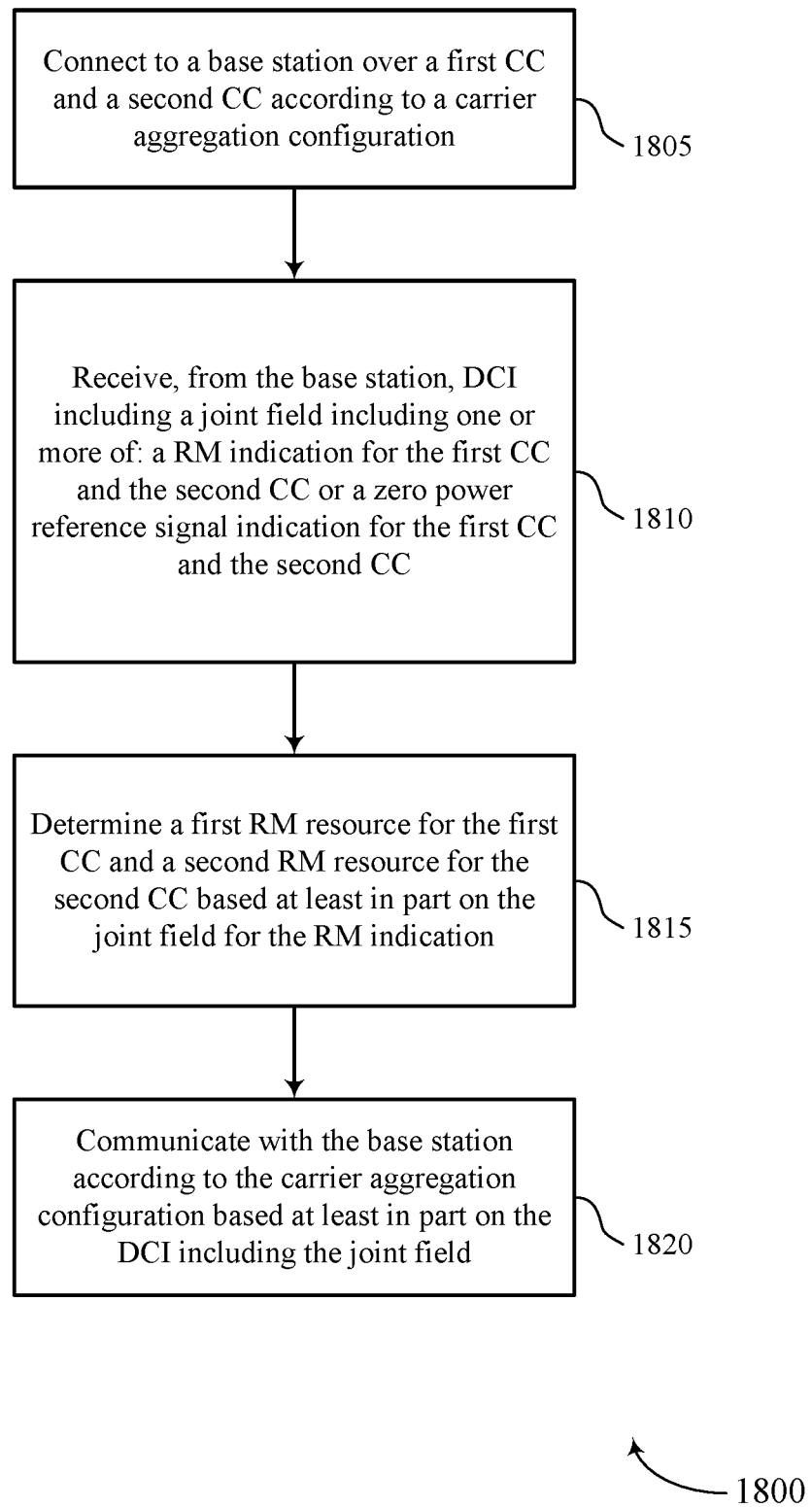

FIG. 18 shows a flowchart illustrating a method 1800 that supports DCI design for multi-CC scheduling in accordance with aspects of the present disclosure. The operations of method 1800 may be implemented by a UE 115 or its components as described herein. For example, the operations of method 1800 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may connect to a base station over a first CC and a second CC according to a carrier aggregation configuration. The operations of 1805 may be performed according to the methods described herein. In some examples, aspects of the operations of 1805 may be performed by a carrier aggregation component as described with reference to FIGS. 8 through 11.

At 1810, the UE may receive, from the base station, DCI including a joint field including one or more of: a RM indication for the first CC and the second CC or a zero power reference signal indication for the first CC and the second CC. The operations of 1810 may be performed according to the methods described herein. In some examples, aspects of the operations of 1810 may be performed by a joint field component as described with reference to FIGS. 8 through 11.

At 1815, the UE may determine a first RMR for the first CC and a second RMR for the second CC based at least in part on the joint field for the RM indication. The operations of 1815 may be performed according to the methods described herein. In some examples, aspects of the operations of 1815 may be performed by a per-CC RMR component as described with reference to FIGS. 8 through 11.

At 1820, the UE may communicate with the base station according to the carrier aggregation configuration based at least in part on the DCI including the joint field. The operations of 1820 may be performed according to the methods described herein. In some examples, aspects of the operations of 1820 may be performed by a carrier aggregation communication component as described with reference to FIGS. 8 through 11.

Figure 19:
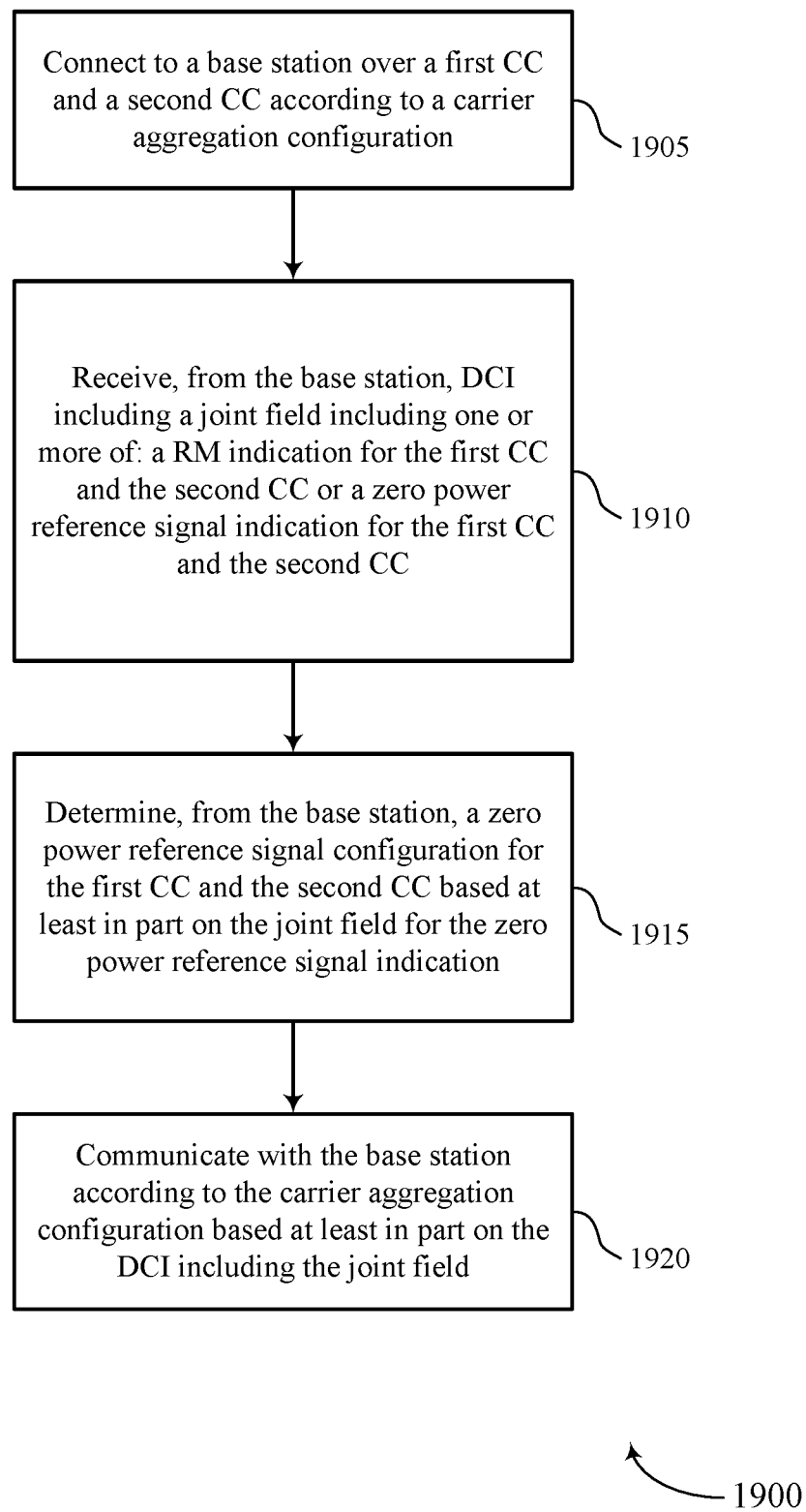

FIG. 19 shows a flowchart illustrating a method 1900 that supports DCI design for multi-CC scheduling in accordance with aspects of the present disclosure. The operations of method 1900 may be implemented by a UE 115 or its components as described herein. For example, the operations of method 1900 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may connect to a base station over a first CC and a second CC according to a carrier aggregation configuration. The operations of 1905 may be performed according to the methods described herein. In some examples, aspects of the operations of 1905 may be performed by a carrier aggregation component as described with reference to FIGS. 8 through 11.

At 1910, the UE may receive, from the base station, DCI including a joint field including one or more of: a RM indication for the first CC and the second CC or a zero power reference signal indication for the first CC and the second CC. The operations of 1910 may be performed according to the methods described herein. In some examples, aspects of the operations of 1910 may be performed by a joint field component as described with reference to FIGS. 8 through 11.

At 1915, the UE may determine, from the base station, a zero power reference signal configuration for the first CC and the second CC based at least in part on the joint field for the zero power reference signal indication. The operations of 1915 may be performed according to the methods described herein. In some examples, aspects of the operations of 1915 may be performed by a joint ZP-CSI-RS component as described with reference to FIGS. 8 through 11.

At 1920, the UE may communicate with the base station according to the carrier aggregation configuration based at least in part on the DCI including the joint field. The operations of 1920 may be performed according to the methods described herein. In some examples, aspects of the operations of 1920 may be performed by a carrier aggregation communication component as described with reference to FIGS. 8 through 11.

Figure 20:
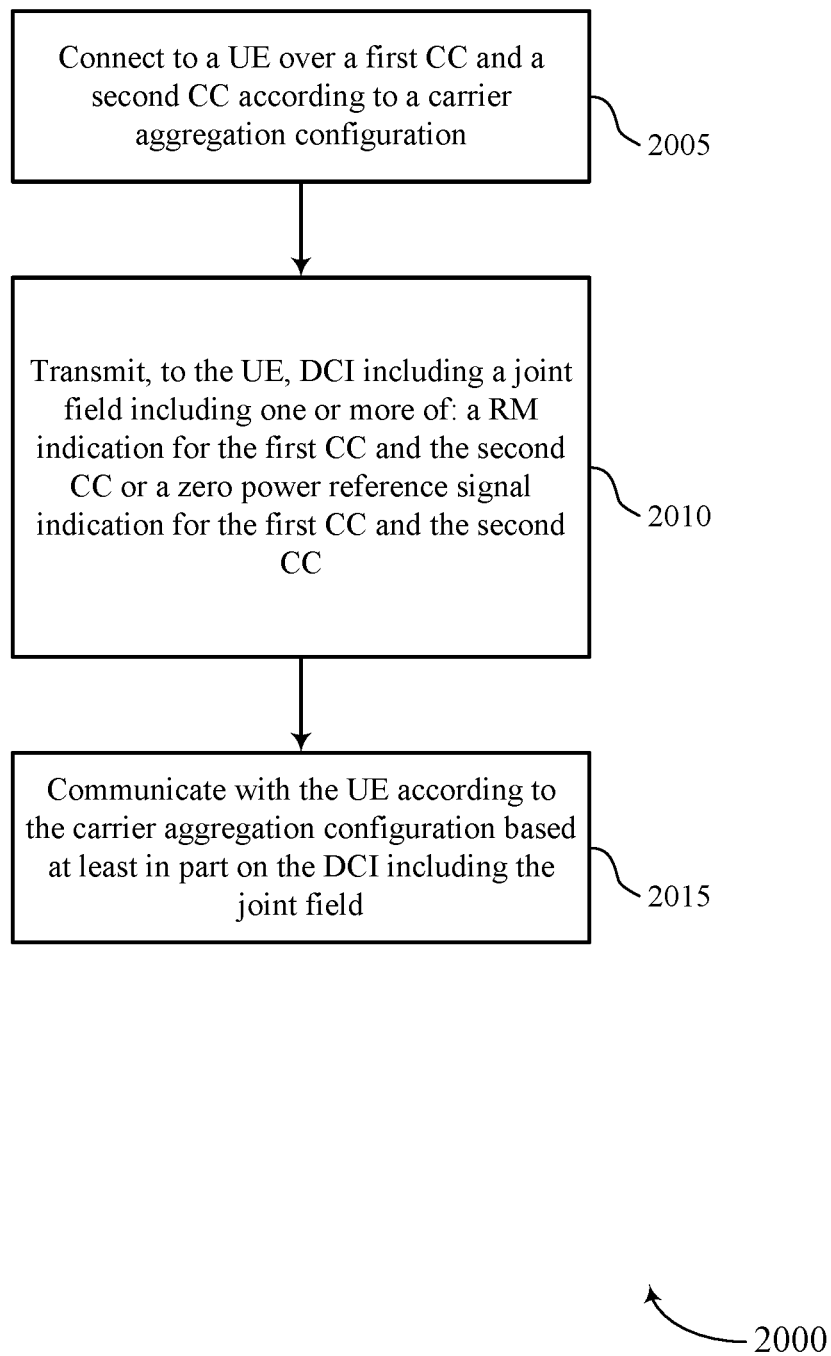

FIG. 20 shows a flowchart illustrating a method 2000 that supports DCI design for multi-CC scheduling in accordance with aspects of the present disclosure. The operations of method 2000 may be implemented by a base station 105 or its components as described herein. For example, the operations of method 2000 may be performed by a base station communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may connect to a UE over a first CC and a second CC according to a carrier aggregation configuration. The operations of 2005 may be performed according to the methods described herein. In some examples, aspects of the operations of 2005 may be performed by a carrier aggregation component as described with reference to FIGS. 12 through 15.

At 2010, the base station may transmit, to the UE, DCI including a joint field including one or more of: a RM indication for the first CC and the second CC or a zero power reference signal indication for the first CC and the second CC. The operations of 2010 may be performed according to the methods described herein. In some examples, aspects of the operations of 2010 may be performed by a joint field indicator as described with reference to FIGS. 12 through 15.

At 2015, the base station may communicate with the UE according to the carrier aggregation configuration based at least in part on the DCI including the joint field. The operations of 2015 may be performed according to the methods described herein. In some examples, aspects of the operations of 2015 may be performed by a carrier aggregation communication component as described with reference to FIGS. 12 through 15.

The following provides an overview of aspects of the present disclosure:

Aspect 1: A method for wireless communications at a UE, comprising: connecting to a base station over a first component carrier and a second component carrier according to a carrier aggregation configuration; receiving, from the base station, downlink control information comprising a joint field comprising one or more of: a rate matching indication for the first component carrier and the second component carrier or a zero power reference signal indication for the first component carrier and the second component carrier; and communicating with the base station according to the carrier aggregation configuration based at least in part on the downlink control information comprising the joint field.

Aspect 2: The method of aspect 1, further comprising: determining a common rate matching resource from a plurality of common rate matching resource configurations for the first component carrier and the second component carrier based at least in part on the joint field for the rate matching indication.

Aspect 3: The method of aspect 2, further comprising: receiving, from the base station, an indication of the plurality of common rate matching resource configurations via radio resource control signaling.

Aspect 4: The method of any of aspects 2 through 3, further comprising: receiving, from the base station, a trigger field for a dynamic rate matching of the common rate matching resource for the first component carrier and the second component carrier via downlink control information.

Aspect 5: The method of any of aspects 2 through 4, wherein each bit of the joint field for the rate matching indication comprises an indication of a rate matching resource group configured for the common rate matching resource configurations.

Aspect 6: The method of any of aspects 1 through 5, further comprising: determining a first rate matching resource for the first component carrier and a second rate matching resource for the second component carrier based at least in part on the joint field for the rate matching indication.

Aspect 7: The method of aspect 6, further comprising: receiving, from the base station, an indication of per-component carrier rate matching resource configurations for each component carrier of the carrier aggregation configuration, wherein the first rate matching resource and the second rate matching resource are determined based at least in part on the per-component carrier rate matching resource configurations.

Aspect 8: The method of any of aspects 6 through 7, further comprising: receiving, from the base station, a trigger field for a dynamic rate matching of the first rate matching resource, the second rate matching resource, or both via downlink control information.

Aspect 9: The method of any of aspects 6 through 8, wherein each bit of the joint field for the rate matching indication comprises an indication of a rate matching resource group configured for each component carrier of the carrier aggregation configuration.

Aspect 10: The method of aspect 9, further comprising: determining that a component carrier of the carrier aggregation configuration is not configured with a corresponding rate matching resource group; and refraining from performing a rate matching procedure for the component carrier based at least in part on the determination that the corresponding rate matching resource group is not configured for the component carrier.

Aspect 11: The method of any of aspects 1 through 10, further comprising: receiving, from the base station, an additional field for an additional rate matching indication for the second component carrier, wherein communications with the base station are based at least in part on the additional rate matching indication.

Aspect 12: The method of any of aspects 1 through 11, further comprising: determining, from the base station, a zero power reference signal configuration for the first component carrier and the second component carrier based at least in part on the joint field for the zero power reference signal indication.

Aspect 13: The method of aspect 12, further comprising: receiving, from the base station, a second additional field for an additional zero power reference signal indication for the second component carrier.

Aspect 14: The method of any of aspects 12 through 13, further comprising: receiving, from the base station, a trigger field for a set identifier associated with the zero power reference signal indication; and determining a resource set for the zero power reference signal indication based at least in part on the set identifier, wherein the resource set is used for the first component carrier and the second component carrier.

Aspect 15: The method of aspect 14, further comprising: determining that a component carrier of the carrier aggregation configuration is not configured with a zero power reference signal resource set corresponding to the determined resource set, wherein the trigger field is ignored for the component carrier based at least in part on the determination that the zero power reference signal resource set is not configured for the component carrier.

Aspect 16: The method of any of aspects 14 through 15, wherein the trigger field is received via downlink control information.

Aspect 17: The method of any of aspects 1 through 16, wherein the zero power reference signal indication comprises a zero power channel state information reference signal resource set indication.

Aspect 18: The method of any of aspects 1 through 17, wherein the rate matching indication comprises a rate matching pattern group indication.

Aspect 19: A method for wireless communications at a base station, comprising: connecting to a UE over a first component carrier and a second component carrier according to a carrier aggregation configuration; transmitting, to the UE, downlink control information comprising a joint field comprising one or more of: a rate matching indication for the first component carrier and the second component carrier or a zero power reference signal indication for the first component carrier and the second component carrier; and communicating with the UE according to the carrier aggregation configuration based at least in part on the downlink control information comprising the joint field.

Aspect 20: The method of aspect 19, further comprising: transmitting, in the joint field for the rate matching indication, an indication of a common rate matching resource from a plurality of common rate matching resource configurations for the first component carrier and the second component carrier.

Aspect 21: The method of aspect 20, further comprising: transmitting, to the UE, an indication of the plurality of common rate matching resource configurations via radio resource control signaling.

Aspect 22: The method of any of aspects 20 through 21, further comprising: transmitting, to the UE, a trigger field for a dynamic rate matching of the common rate matching resource for the first component carrier and the second component carrier via downlink control information.

Aspect 23: The method of any of aspects 20 through 22, wherein each bit of the joint field for the rate matching indication comprises an indication of a rate matching resource group configured for the common rate matching resource configurations.

Aspect 24: The method of any of aspects 19 through 23, further comprising: transmitting, in the joint field for the rate matching indication, a first rate matching resource for the first component carrier and a second rate matching resource for the second component carrier.

Aspect 25: The method of aspect 24, further comprising: transmitting, to the UE, an indication of per-component carrier rate matching resource configurations for each component carrier of the carrier aggregation configuration, wherein the first rate matching resource and the second rate matching resource are determined based at least in part on the per-component carrier rate matching resource configurations.

Aspect 26: The method of any of aspects 24 through 25, further comprising: transmitting, to the UE, a trigger field for a dynamic rate matching of the first rate matching resource, the second rate matching resource, or both via downlink control information.

Aspect 27: The method of any of aspects 24 through 26, wherein each bit of the joint field for the rate matching indication comprises an indication of a rate matching resource group configured for each component carrier of the carrier aggregation configuration.

Aspect 28: The method of any of aspects 19 through 27, further comprising: transmitting, to the UE, an additional field for an additional rate matching indication for the second component carrier, wherein communications with the UE are based at least in part on the additional rate matching indication.

Aspect 29: The method of any of aspects 19 through 28, further comprising: transmitting, to the UE, a zero power reference signal configuration for the first component carrier and the second component carrier based at least in part on the zero power reference signal indication in the joint field of the downlink control information.

Aspect 30: The method of aspect 29, further comprising: transmitting, to the UE, a second additional field for an additional zero power reference signal indication for the second component carrier.

Aspect 31: The method of any of aspects 29 through 30, further comprising: determining a resource set for the zero power reference signal indication, wherein the resource set is used for the first component carrier and the second component carrier; and transmitting, to the UE, a trigger field for a set identifier associated with the zero power reference signal indication, the set identifier corresponding to the determined resource set.

Aspect 32: The method of aspect 31, wherein the trigger field is transmitted via downlink control information.

Aspect 33: The method of any of aspects 19 through 32, wherein the zero power reference signal indication comprises a zero power channel state information reference signal resource set indication.

Aspect 34: The method of any of aspects 19 through 33, wherein the rate matching indication comprises a rate matching pattern group indication.

Aspect 35: An apparatus for wireless communications at a UE, comprising at least one processor; memory coupled with the at least one processor; and instructions stored in the memory and executable by the at least one processor to cause the apparatus to perform a method of any of aspects 1 through 18.

Aspect 36: An apparatus for wireless communications at a UE, comprising at least one means for performing a method of any of aspects 1 through 18.

Aspect 37: A non-transitory computer-readable medium storing code for wireless communications at a UE, the code comprising instructions executable by a processor to perform a method of any of aspects 1 through 18.

Aspect 38: An apparatus for wireless communications at a base station, comprising at least one processor; memory coupled with the at least one processor; and instructions stored in the memory and executable by the at least one processor to cause the apparatus to perform a method of any of aspects 19 through 34.

Aspect 39: An apparatus for wireless communications at a base station, comprising at least one means for performing a method of any of aspects 19 through 34.

Aspect 40: A non-transitory computer-readable medium storing code for wireless communications at a base station, the code comprising instructions executable by a processor to perform a method of any of aspects 19 through 34.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software (e.g., executed by a processor), hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   connecting to a network entity over a first component carrier and a second component carrier according to a carrier aggregation configuration;
   receiving, from the network entity, downlink control information comprising a joint field comprising one or more of: a rate matching indication for the first component carrier and the second component carrier or a zero power reference signal indication for the first component carrier and the second component carrier, wherein each bit of the joint field for the rate matching indication comprises an indication of a rate matching resource group configured for each component carrier of the carrier aggregation configuration;
   determining a first rate matching resource for the first component carrier and a second rate matching resource for the second component carrier based at least in part on the joint field for the rate matching indication;
   determining that a component carrier of the carrier aggregation configuration is not configured with a corresponding rate matching resource group;
   refraining from performing a rate matching procedure for the component carrier based at least in part on the determination that the component carrier is not configured with the corresponding rate matching resource group; and
   communicating with the network entity according to the carrier aggregation configuration based at least in part on the downlink control information comprising the joint field.

2. The method of claim 1, further comprising:
   receiving, from the network entity, an indication of per-component carrier rate matching resource configurations for each component carrier of the carrier aggregation configuration, wherein the first rate matching resource and the second rate matching resource are determined based at least in part on the per-component carrier rate matching resource configurations.

3. The method of claim 1, further comprising:
   receiving, from the network entity, a trigger field for a dynamic rate matching of the first rate matching resource, the second rate matching resource, or both via downlink control information.

4. The method of claim 1, further comprising:
   receiving, from the network entity, an additional field for an additional rate matching indication for the second component carrier, wherein communications with the network entity are based at least in part on the additional rate matching indication.

5. The method of claim 1 further comprising:
   receiving, from the network entity and via downlink control information, a trigger field for a set identifier associated with the zero power reference signal indication;
   determining a resource set for the zero power reference signal indication based at least in part on the set identifier, wherein the resource set is used for the first component carrier and the second component carrier; and
   determining that a component carrier of the carrier aggregation configuration is not configured with a zero power reference signal resource set corresponding to the determined resource set, wherein the trigger field is ignored for the component carrier based at least in part on the determination that the zero power reference signal resource set is not configured for the component carrier.

6. An apparatus for wireless communications at a user equipment (UE), comprising:
   at least one processor,
   memory coupled to the at least one processor; and
   instructions stored in the memory and executable by the at least one processor to cause the apparatus to:
      connect to a network entity over a first component carrier and a second component carrier according to a carrier aggregation configuration;
      receive, from the network entity, downlink control information comprising a joint field comprising one or more of: a rate matching indication for the first component carrier and the second component carrier or a zero power reference signal indication for the first component carrier and the second component carrier, wherein each bit of the joint field for the rate matching indication comprises an indication of a rate matching resource group configured for each component carrier of the carrier aggregation configuration;
      determine a first rate matching resource for the first component carrier and a second rate matching resource for the second component carrier based at least in part on the joint field for the rate matching indication;
      determine that a component carrier of the carrier aggregation configuration is not configured with a corresponding rate matching resource group;
      refrain from performing a rate matching procedure for the component carrier based at least in part on the determination that the component carrier is not configured with the corresponding rate matching resource group; and
      communicate with the network entity according to the carrier aggregation configuration based at least in part on the downlink control information comprising the joint field.

7. The apparatus of claim 6, wherein the instructions are further executable by the at least one processor to cause the apparatus to:
   receive, from the network entity, an indication of per-component carrier rate matching resource configurations for each component carrier of the carrier aggregation configuration, wherein the first rate matching resource and the second rate matching resource are determined based at least in part on the per-component carrier rate matching resource configurations.

8. The apparatus of claim 6, wherein the instructions are further executable by the at least one processor to cause the apparatus to:
   receive, from the network entity, a trigger field for a dynamic rate matching of the first rate matching resource, the second rate matching resource, or both via downlink control information.

9. The apparatus of claim 6, wherein the instructions are further executable by the at least one processor to cause the apparatus to:
   receive, from the network entity, an additional field for an additional rate matching indication for the second component carrier, wherein communications with the network entity are based at least in part on the additional rate matching indication.

10. The apparatus of claim 6, wherein the instructions are further executable by the at least one processor to cause the apparatus to:
 determine, from the network entity, a zero power reference signal configuration for the first component carrier and the second component carrier based at least in part on the joint field for the zero power reference signal indication.

11. The apparatus of claim 10, wherein the instructions are further executable by the at least one processor to cause the apparatus to:
 receive, from the network entity, a second additional field for an additional zero power reference signal indication for the second component carrier.

12. The apparatus of claim 10, wherein the instructions are further executable by the at least one processor to cause the apparatus to:
 receive, from the network entity and via downlink control information, a trigger field for a set identifier associated with the zero power reference signal indication; and
 determine a resource set for the zero power reference signal indication based at least in part on the set identifier, wherein the resource set is used for the first component carrier and the second component carrier.

13. The apparatus of claim 12, wherein the instructions are further executable by the at least one processor to cause the apparatus to:
 determine that a component carrier of the carrier aggregation configuration is not configured with a zero power reference signal resource set corresponding to the determined resource set, wherein the trigger field is ignored for the component carrier based at least in part on the determination that the zero power reference signal resource set is not configured for the component carrier.

14. A method for wireless communications at a network entity, comprising:
 connecting to a user equipment (UE) over a first component carrier and a second component carrier according to a carrier aggregation configuration;
 transmitting, to the UE, downlink control information comprising a joint field comprising one or more of: a rate matching indication for the first component carrier and the second component carrier or a zero power reference signal indication for the first component carrier and the second component carrier, wherein each bit of the joint field for the rate matching indication comprises an indication of a rate matching resource group configured for each component carrier of the carrier aggregation configuration, a first rate matching resource for the first component carrier and a second rate matching resource for the second component carrier are determined based at least in part on the joint field for the rate matching indication, and performance of a rate matching procedure for the component carrier is refrained from based at least in part on a determination that the component carrier is not configured with the corresponding rate matching resource group; and
 communicating with the UE according to the carrier aggregation configuration based at least in part on the downlink control information comprising the joint field.

15. An apparatus for wireless communications at a network entity, comprising:
 at least one processor;
 memory coupled to the at least one processor; and
 instructions stored in the memory and executable by the at least one processor to cause the apparatus to:
  connect to a user equipment (UE) over a first component carrier and a second component carrier according to a carrier aggregation configuration;
  transmit, to the UE, downlink control information comprising a joint field comprising one or more of: a rate matching indication for the first component carrier and the second component carrier or a zero power reference signal indication for the first component carrier and the second component carrier, wherein each bit of the joint field for the rate matching indication comprises an indication of a rate matching resource group configured for each component carrier of the carrier aggregation configuration, a first rate matching resource for the first component carrier and a second rate matching resource for the second component carrier are determined based at least in part on the joint field for the rate matching indication, and performance of a rate matching procedure for the component carrier is refrained from based at least in part on a determination that the component carrier is not configured with the corresponding rate matching resource group; and
  communicate with the UE according to the carrier aggregation configuration based at least in part on the downlink control information comprising the joint field.

16. A method for wireless communications at a user equipment (UE), comprising:
 connecting to a network entity over a first component carrier and a second component carrier according to a carrier aggregation configuration;
 receiving, from the network entity, downlink control information comprising a joint field comprising one or more of: a rate matching indication for the first component carrier and the second component carrier or a zero power reference signal indication for the first component carrier and the second component carrier;
 determining a zero power reference signal configuration for the first component carrier and the second component carrier based at least in part on the joint field for the zero power reference signal indication;
 receiving, from the network entity and via downlink control information, a trigger field for a set identifier associated with the zero power reference signal indication;
 determining a resource set for the zero power reference signal indication based at least in part on the set identifier, wherein the resource set is used for the first component carrier and the second component carrier;
 determining that a component carrier of the carrier aggregation configuration is not configured with a zero power reference signal resource set corresponding to the determined resource set, wherein the trigger field is ignored for the component carrier based at least in part on the determination that the component carrier is not configured with the zero power reference signal resource set; and
 communicating with the network entity according to the carrier aggregation configuration based at least in part on the downlink control information comprising the joint field.

17. The method of claim 16, further comprising:
receiving, from the network entity, a second additional field for an additional zero power reference signal indication for the second component carrier.

18. An apparatus for wireless communications at a user equipment (UE), comprising:
at least one processor,
memory coupled to the at least one processor; and
instructions stored in the memory and executable by the at least one processor to cause the apparatus to:
connect to a network entity over a first component carrier and a second component carrier according to a carrier aggregation configuration;
receive, from the network entity, downlink control information comprising a joint field comprising one or more of: a rate matching indication for the first component carrier and the second component carrier or a zero power reference signal indication for the first component carrier and the second component carrier;
determine a zero power reference signal configuration for the first component carrier and the second component carrier based at least in part on the joint field for the zero power reference signal indication;
receive, from the network entity and via downlink control information, a trigger field for a set identifier associated with the zero power reference signal indication;
determine a resource set for the zero power reference signal indication based at least in part on the set identifier, wherein the resource set is used for the first component carrier and the second component carrier;
determine that a component carrier of the carrier aggregation configuration is not configured with a zero power reference signal resource set corresponding to the determined resource set, wherein the trigger field is ignored for the component carrier based at least in part on the determination that the component carrier is not configured with the zero power reference signal resource set; and
communicate with the network entity according to the carrier aggregation configuration based at least in part on the downlink control information comprising the joint field.

19. The apparatus of claim 18, wherein the instructions are further executable by the at least one processor to cause the apparatus to receive, from the network entity, a second additional field for an additional zero power reference signal indication for the second component carrier.

20. A method for wireless communications at a network entity, comprising:
connecting to a user equipment (UE) over a first component carrier and a second component carrier according to a carrier aggregation configuration;
transmitting, to the UE, downlink control information comprising a joint field comprising one or more of: a rate matching indication for the first component carrier and the second component carrier or a zero power reference signal indication for the first component carrier and the second component carrier, wherein a zero power reference signal configuration for the first component carrier and the second component carrier is determined based at least in part on the joint field for the zero power reference signal indication;
transmitting, to the UE and via downlink control information, a trigger field for a set identifier associated with the zero power reference signal indication, wherein a resource set for the zero power reference signal indication is determined based at least in part on the set identifier, the resource set is used for the first component carrier and the second component carrier, and the trigger field is ignored for the component carrier based at least in part on a determination that the component carrier is not configured with a zero power reference signal resource set corresponding to the determined resource set; and
communicating with the UE according to the carrier aggregation configuration based at least in part on the downlink control information comprising the joint field.

21. An apparatus for wireless communications at a network entity, comprising:
at least one processor,
memory coupled to the at least one processor; and
instructions stored in the memory and executable by the at least one processor to cause the apparatus to:
connect to a user equipment (UE) over a first component carrier and a second component carrier according to a carrier aggregation configuration;
transmit, to the UE, downlink control information comprising a joint field comprising one or more of: a rate matching indication for the first component carrier and the second component carrier or a zero power reference signal indication for the first component carrier and the second component carrier, wherein a zero power reference signal configuration for the first component carrier and the second component carrier is determined based at least in part on the joint field for the zero power reference signal indication;
transmit, to the UE and via downlink control information, a trigger field for a set identifier associated with the zero power reference signal indication, wherein a resource set for the zero power reference signal indication is determined based at least in part on the set identifier, the resource set is used for the first component carrier and the second component carrier, and the trigger field is ignored for the component carrier based at least in part on a determination that the component carrier is not configured with a zero power reference signal resource set corresponding to the determined resource set; and
communicate with the UE according to the carrier aggregation configuration based at least in part on the downlink control information comprising the joint field.

* * * * *